(12) United States Patent
Suzuki

(10) Patent No.: US 7,582,016 B2
(45) Date of Patent: Sep. 1, 2009

(54) GAME SYSTEM AND GAME PROGRAM

(75) Inventor: Toshiaki Suzuki, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 791 days.

(21) Appl. No.: 10/697,939

(22) Filed: Oct. 31, 2003

(65) Prior Publication Data

US 2004/0092309 A1    May 13, 2004

(30) Foreign Application Priority Data

Nov. 11, 2002   (JP)   ............................. 2002-327245

(51) Int. Cl.
*A63F 9/24* (2006.01)
*G06T 13/00* (2006.01)
(52) U.S. Cl. ...................... 463/32; 463/30; 463/34; 463/43; 345/426; 345/473
(58) Field of Classification Search ............ 463/30–31, 463/40–43; 345/659–654, 619, 419
See application file for complete search history.

(56) References Cited

U.S. PATENT DOCUMENTS

| | | | |
|---|---|---|---|
| 6,238,291 B1 * | 5/2001 | Fujimoto et al. ............... | 463/44 |
| 6,254,481 B1 * | 7/2001 | Jaffe ........................... | 463/20 |
| 6,500,070 B1 | 12/2002 | Tomizawa et al. | |
| 6,657,627 B1 * | 12/2003 | Wada et al. .................. | 345/473 |
| 7,115,031 B2 * | 10/2006 | Miyamoto et al. ............. | 463/1 |

FOREIGN PATENT DOCUMENTS

| | | |
|---|---|---|
| JP | 2000-334170 | 12/2000 |
| JP | 2003-053038 | 2/2003 |

OTHER PUBLICATIONS

Takai et al., Game & Watch Multi Screen Donkey Kong II, [Kodomo Pocket Hyakka] New Color Edition Electronic Games Daisakusen, Jitsugyo no Nihon Sha, Ltd., Nov. 24, 1983, pp. 188-189, 2 pages, with a partial English translation.

* cited by examiner

*Primary Examiner*—Peter DungBa Vo
*Assistant Examiner*—Alex F. R. P. Rada, II
(74) *Attorney, Agent, or Firm*—Nixon & Vanderhye P.C.

(57) ABSTRACT

In a game system in which two related virtual game spaces are separately displayed on a first display device and a second display device, an object, contained in a first game space represented by a three-dimensional coordinate system, is displayed on the first display device, and an object, contained in a second game space represented by a two-dimensional coordinate system, is displayed on the second display device. A coordinate conversion process is performed in which coordinates indicating a current location of the object in the first game space are mathematically projected onto a two-dimensional plane within the first game space that corresponds to the second game space, so as to determine coordinates in the second game space, that are indicative of a location where a shadow of the object would occur in the two-dimensional plane of the second game space when produced by a light source positioned at a predetermined location in the first game space.

40 Claims, 25 Drawing Sheets

F I G. 2
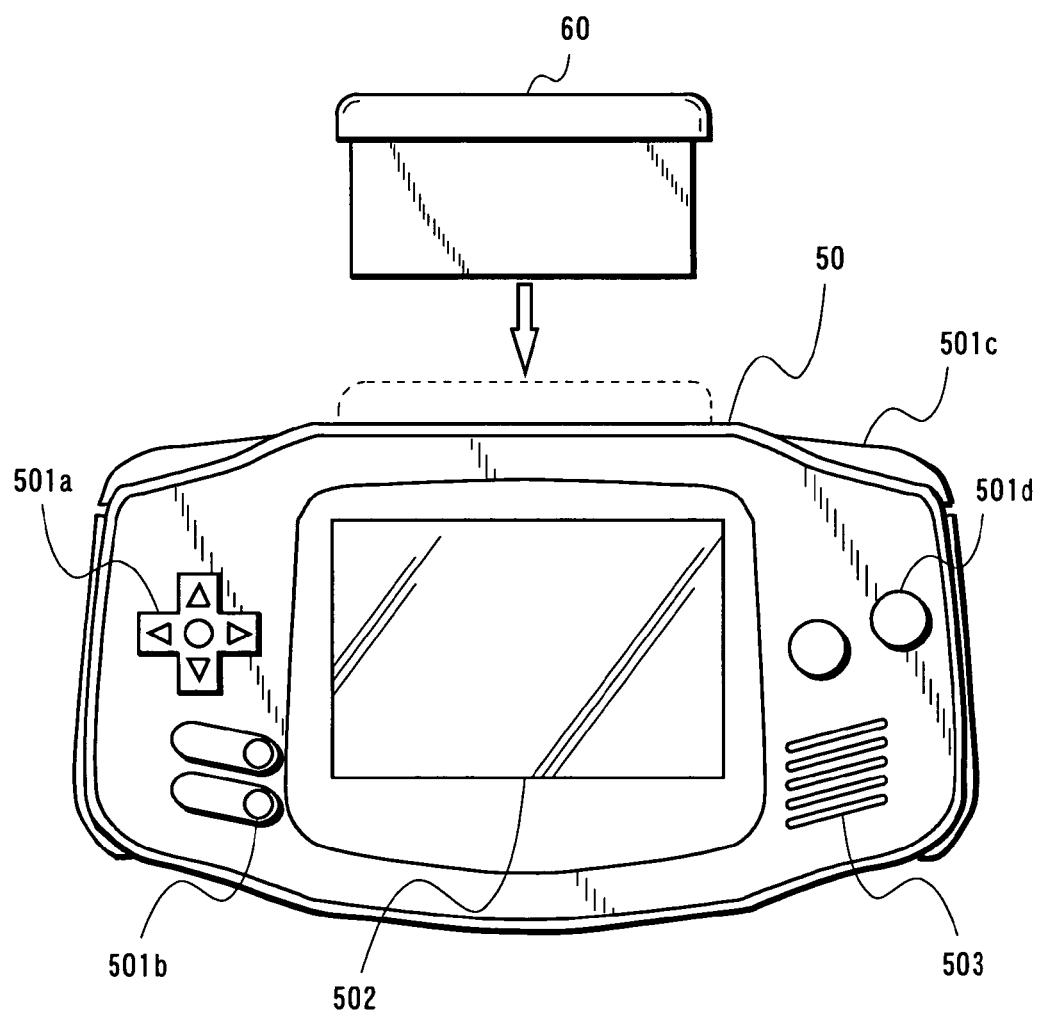

F I G. 5
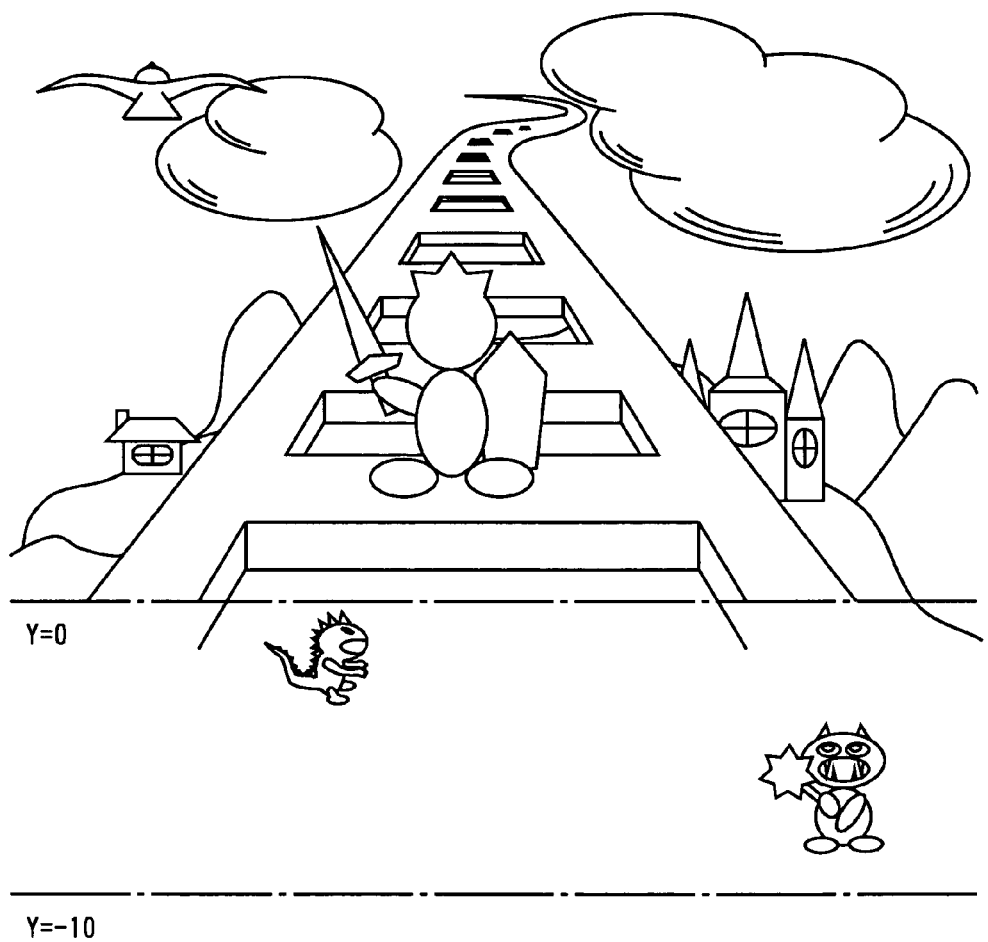
Y=0
Y=-10

F I G. 8
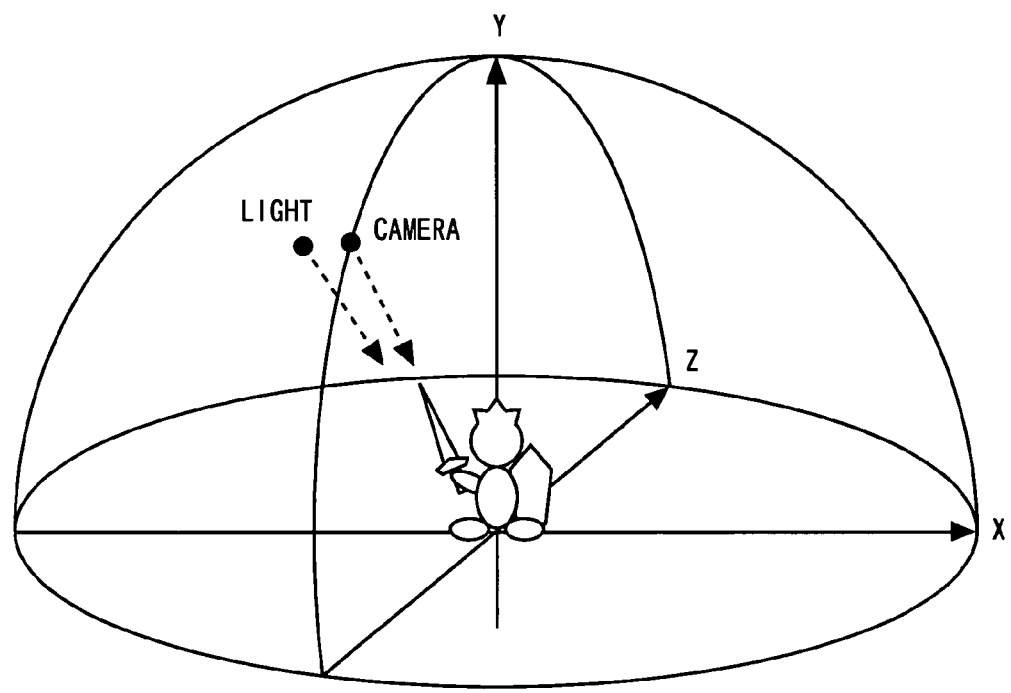

F I G. 1 2
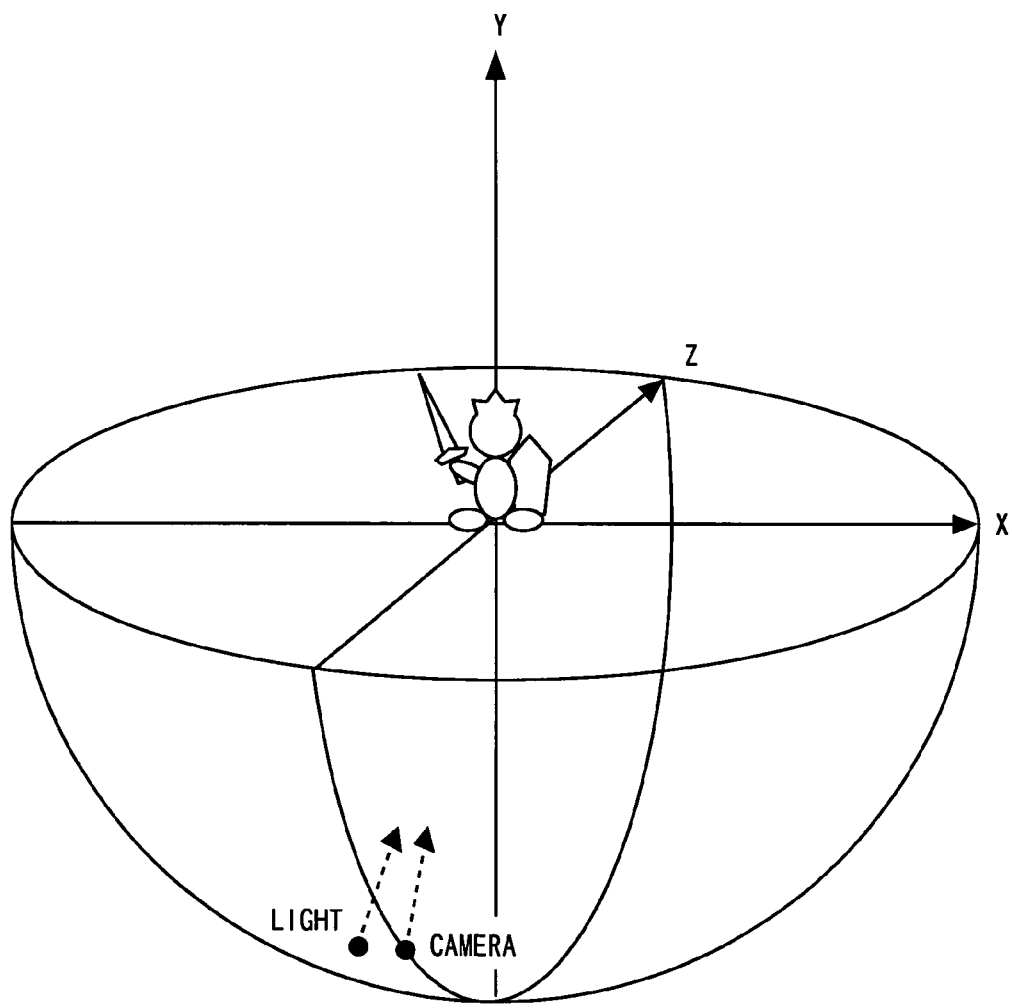

FIG. 15

MEMORY MAP OF DVD 30

| PROGRAM DATA |
|---|
| PROGRAM FOR MOVING PLAYER OBJECT |
| PROGRAM FOR MOVING SIMPLE-MOTION OBJECTS IN GC WORLD |
| PROGRAM FOR MOVING COMPLEX-MOTION OBJECTS IN GC WORLD |
| PROGRAM FOR MOVING SIMPLE-MOTION OBJECTS IN GBA WORLD |
| RENDERING PROGRAM FOR PLAYER OBJECT |
| RENDERING PROGRAM FOR SIMPLE-MOTION OBJECTS IN GC WORLD |
| RENDERING PROGRAM FOR COMPLEX-MOTION OBJECTS IN GC WORLD |
| RENDERING PROGRAM FOR FIXED OBJECTS IN GC WORLD |
| RENDERING PROGRAM FOR TERRAIN OBJECTS IN GC WORLD |
| SHADOW RENDERING PROGRAM FOR OBJECTS IN GC WORLD |
| SHADOW RENDERING PROGRAM FOR SIMPLE-MOTION OBJECTS IN GBA WORLD |
| SHADOW RENDERING PROGRAM FOR COMPLEX-MOTION OBJECTS IN GBA WORLD |
| SHADOW RENDERING PROGRAM FOR FIXED OBJECTS IN GBA WORLD |
| OTHER GAME PROGRAMS |

| LAYOUT DATA OF TERRAIN OBJECTS IN GC WORLD |
|---|
| LAYOUT DATA OF FIXED OBJECTS |
| COORDINATES OF FIXED OBJECTS IN GC WORLD (X, Y, Z) |
| OBJECT 1 |
| OBJECT 2 |
| ... |
| COORDINATES OF FIXED OBJECTS IN GBA WORLD (X, Z) |
| OBJECT 1 |
| OBJECT 2 |
| ... |

| POLYGON/TEXTURE DATA |
|---|
| PLAYER OBJECT |
| SIMPLE-MOTION OBJECTS IN GC WORLD |
| COMPLEX-MOTION OBJECTS IN GC WORLD |
| FIXED OBJECTS IN GC WORLD |
| TERRAIN OBJECTS IN GC WORLD |

| SHADOW VOLUME DATA |
|---|
| SHADOW OF PLAYER OBJECT |
| SHADOWS OF SIMPLE-MOTION OBJECTS IN GBA WORLD |
| SHADOWS OF COMPLEX-MOTION OBJECTS IN GBA WORLD |
| SHADOWS OF FIXED OBJECTS IN GBA WORLD |

| OTHER DATA (SOUND DATA, ETC.) |
|---|

F I G. 1 6
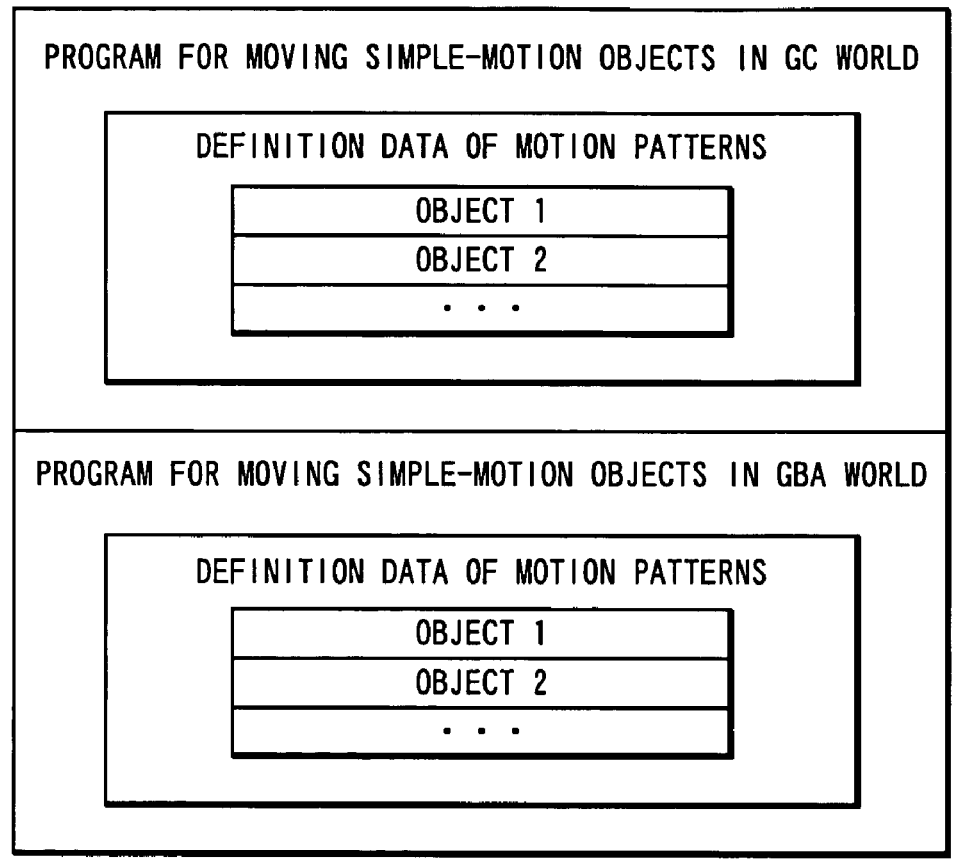

MEMORY MAP OF ROM 601

GAME SYSTEM AND GAME PROGRAM

FIELD OF THE INVENTION

The exemplary illustrative embodiments relate to game systems and game programs. More specifically, the exemplary illustrative embodiments relate to a game system and a game program for displaying a game space on one of two display means and another game space on the other display means.

BACKGROUND AND SUMMARY OF THE INVENTION

An example of the game system for displaying a game space on one of two display means and another game space on the other display means is disclosed in Japanese Patent Laid-Open Publication No. 2003-053038 (published on Feb. 25, 2003) filed by the same Assignee of the present application. In this game system, a first floor of a labyrinth representing a game space is displayed on a television monitor, while a second floor thereof is displayed on an LCD of a portable game machine.

However, the above game system could be further improved to clearly convey a positional relationship between the first floor displayed on the television monitor and the second floor displayed on the LCD. That is, it sometimes is not clear which position on the first floor corresponds to which position on the second floor located above the first floor. This is because the game worlds are separately displayed on the respective display means in a manner such that only the game world on the first floor is displayed on the television monitor and only the game world on the second floor is displayed on the LCD. When a player desires to move a character from the first floor to the second floor in the course of the game, for example, it is difficult to accurately predict in advance a position of the character after such movement. This might give the player an impression that the game system is difficult to operate.

Therefore, certain exemplary illustrative embodiments provide a game system and a game program in which two game spaces are separately displayed on two display means so that the player can easily know a positional relationship between these game spaces.

Certain exemplary illustrative embodiments provide a game system and a game program in which two game spaces are separately displayed on two display means so that the player can comfortably know a positional relationship between these game spaces.

Certain exemplary illustrative embodiments provide a game system and a game program in which two game spaces are separately displayed on two display means so that the player can easily know the positions of objects located in the game space displayed on one display means based on a game image displayed on the other display means.

Certain exemplary illustrative embodiments provide a game system and a game program in which game spaces are separately displayed on two game machines so that the amount of communication can be reduced and the player can easily know a positional relationship between the game spaces.

Certain exemplary illustrative embodiments provide a game system and a game program in which in which two game spaces are separately displayed on two display means so that the player can easily know in which game space a player character is currently located.

In order to achieve the features mentioned above, certain exemplary illustrative embodiments have the following aspects. Note that terms and reference numerals in parenthesis merely indicate a correspondence with one or more exemplary illustrative embodiments which will be described further below, and are not intended to restrict the scope of the present invention.

A first aspect of certain exemplary illustrative embodiments is directed to a game system in which two game spaces (GC world and GBA world) are separately displayed on first display means (101) and second display means (502). In the first aspect, the game spaces mean virtual game spaces represented by the game system. The game system includes first display control means (CPU 201 executing a rendering program stored in the DVD 30) which causes a first game space to be displayed on the first display means (GC world); and second display control means (CPU core 506 executing a rendering program stored in the ROM 601) which causes a second game space (GBA world), which is different (for example, separate) from the first game space, to be displayed on the second display means. The first game space is differentiated from the second game space and, by way of example, the first game space is separated from the second game space. Based on a virtual positional relationship (Y=0, Y=−10) between the first game space and the second game space, the second display control means causes a related image (shadow image or translucent image) of an object located in the first game space to be displayed on the second display means. In the first aspect, the related image is not restricted to a shadow image or a translucent image of the object, but can also be an outline of the object merely indicated by a dotted line, a mark, such as an arrow, merely indicative of the location of the object, and a name merely indicative of a name of the object.

In a second aspect based on the first aspect, the first display control means causes only the first game space to be displayed on the first display means, and the second display control means causes only the second game space to be displayed on the second display means.

In a third aspect based on the first aspect, the object is a player character operated by a player.

In a fourth aspect based on the first aspect, the object is a moving object (player character, clouds, a bird, etc).

In a fifth aspect based on the first aspect, the game system further includes judging means (CPU 201 executing steps S105 and S109) which judges whether predetermined conditions are satisfied; and moving means (CPU 201 executing steps S106 and S109) which moves, when the determining means determines that the predetermined conditions are satisfied, a player character between the first game space and the second game space; and determining means (CPU 201 executing steps S113 and S119 and the CPU core 506 executing step S206) which determines which one of the first game space and the second game space the player character is located. When the determining means determines that the player character is located in the first game space (YES in S119), the first display control means causes the player character to be displayed on the first display means (S120). When the determining means determines that the player character is located in the second game space (YES in S206), the second display control means causes the player character to be displayed on the second display means (S207).

In a sixth aspect based on the first aspect, the second display control means causes a related image of an object which is located in the first game space but is not located in the second game space (clouds, a bird, a ladder to the sky, etc.) to be displayed on the second display means.

In a seventh aspect based on the first aspect, the first display control means includes a first storage section (30) for storing data used for displaying the first game space, the second display control means (601) includes a second storage section for storing data used for displaying the second game space. The first storage section stores object data (polygon/texture data) for displaying an object which is located in the first game space but is not located in the second game space. The second storage section stores related image display data (shadow image data) for displaying a related image of the object which is located in the first game space but is not located in the second game space. Based on the related image display data, the second display control means causes the related image of the object which is located in the first game space but is not located in the second game space to be displayed on the second display means.

In an eighth aspect based on the first aspect, the related image is an image representing a shadow of the object.

In a ninth aspect based on the first aspect, the second game space is a two-dimensional game space (GBA world). The second display control means (CPU core 506 executing the rendering program stored in the ROM 601) includes a shadow image storage section (601) for storing a shadow image of the object located in the first game space (GC world). Based on a position in the first game space of the object located in the first game space and the virtual positional relationship, the second display control means causes the shadow image to be displayed at a position on which the object located in the first game space (GC world) casts a shadow in the second game space (GBA world).

In a tenth aspect based on the first aspect, the second game space is a three-dimensional game space (GC world). Based on a position in the first game space of the object (a monster, a castle, a house, etc.) located in the first game space (GBA world) and the virtual positional relationship, the second display control means (CPU 201 executing the rendering program stored in the DVD 30) the second display control means causes the object located in the first game space (the GBA world) to be virtually placed in the second game space (the GC world), and based on the placed object, causes a shadow of the object to be displayed.

In an eleventh aspect based on the first aspect, the second game space is a three-dimensional game space (GC world). The second display control means (CPU 201 executing the rendering program stored in the DVD 30) includes a shadow volume storage section (30) for storing a shadow volume of the object (the monster, the castle, the house, etc.) located in the first game space (GBA world), causes the shadow volume to be placed in the second game space (GC world) based on a position in the first game space of the object located in the first game space and the virtual positional relationship, and causes a shadow of the object by using the placed shadow volume.

In a twelfth aspect based on the first aspect, the second display control means changes a size of the related image in accordance with a virtual relative positional relationship ((x1, y1, z1), (x2, −10, z2)) between the object located in the first game space and the second game space (this can be achieved by the CPU core 506 executing S210).

In a thirteenth aspect based on the first aspect, the game system further includes a first game machine (20) for generating image data representing the first game space and outputting the image data to the first display means (10); and a second game machine (50) for generating image data representing the second game space and outputting the image data to the second display means (502).

In a fourteenth aspect based on the thirteenth aspect, the second game machine obtains a position in the first game space of the object located in the first game space from the first game machine (this can achieved by the CPU core 506 executing in S202), and, based on the obtained position, causes the related image to be displayed on the second display means.

In a fifteenth aspect based on the thirteenth aspect, the second game machine includes predicting means (CPU core 506 executing S203) which predicts a position in the first game space of the object located in the first game space and, based on the predicted position, causes the related image to be displayed on the second display means.

In a sixteenth aspect based on the fifteenth aspect, the second game machine stores a motion pattern of the object located in the first game space (FIG. 19). Based on the motion pattern, the predicting means predicts a position in the first game space of the object.

In a seventeenth aspect based on the thirteenth aspect, the second game machine stores in advance a position of a fixed object fixedly located in the first game space (the GC world) and, based on the position, causes the related image of the fixed object to be displayed.

In an eighteenth aspect based on the thirteenth aspect, the second game is a portable game machine (50) including the second display means.

According to the above-mentioned second aspect, when the player desires to move the player character from the first game space to the second game space, for example, the player can easily know the corresponding position in the second game space, and therefore can exactly know a position to which the player character is going to be moved.

According to the above-mentioned fourth aspect, the player can know the state of the first game space (e.g., the state of movement of the moving character) only by viewing the second display means. This is particularly effective in a case where the player character is located in the second game space. In this case, the player normally plays the game by viewing the second display means. Even when viewing only the second display means, the player can know the state of the first game space.

According to the above-mentioned sixth aspect, the player can know the existence and position of an object which is located only in the first game space and is not displayed on the second display means only by viewing the game image displayed on the second display means.

According to the above-mentioned seventh aspect, the player can know the existence and position of an object which is stored only in the first storage section and is not stored in the second storage section only by viewing the game image displayed on the second display means.

According to the above-mentioned eighth aspect, with a shadow of the object located in the first game space being displayed in the second game space, the positional relationship can be naturally displayed without appearing unnatural.

According to the above-mentioned ninth aspect, the shadow image stored in advance is used for displaying a shadow. Therefore, no shadow image has to be generated every time a shadow is to be displayed, thereby reducing the processing load.

According to the above-mentioned tenth aspect, when the second game space is a third-dimensional game space, the shadow of the object located in the first game space can be appropriately displayed.

According to the above-mentioned eleventh aspect, the shadow volume stored in advance is used for displaying a shadow. Therefore, a realistic shadow can be displayed. Furthermore, an increase in the processing load can be avoided and/or reduced.

According to the above-mentioned twelfth aspect, the player can know in more detail the position of the object located in the first game space only by viewing the game image displayed on the second display means. For example, when the first game space and the second game space have a positional relationship in which these spaces are vertically aligned, the position in height of an object located in the first game space can be known from the display size of the related image.

According to the above-mentioned thirteenth aspect, with the related image of the object located in the first game space, it is possible to display the positional relationship between the first game space handled by the first game machine and the second game space handled by the second game machine so that the player can easily know the relationship. Also, the player can know the position of the object located in the first game space only by viewing the game image displayed on the second display means.

According to the above-mentioned fourteenth aspect, for example, a related image of an object whose motion pattern randomly changes can be displayed at a correct position with little communication between two game machines.

According to the above-mentioned fifteenth aspect, the position of the object located in the first game space is predicted by the second game machine. Therefore, transmitting the position of the object from the first game machine to the second game machine is not required. Thus, the amount of communication can be reduced.

According to the above-mentioned sixteenth aspect, the motion destination of the object can be easily predicted by storing the motion pattern in advance.

According to the above-mentioned seventeenth aspect, the position of the object located in the first game space is stored in advance in the second game machine. Therefore, the related image can be displayed at a correct position without transmitting the position of the object from the first game machine to the second game machine.

According to the above-mentioned eighteenth aspect, with the related image of the object located in the first game space, it is possible to display the positional relationship between the first game space handled by the first game machine and the second game space handled by the second game machine, which is a portable game machine, so that the player can easily know the relationship. Also, the player can know the position of the object located in the first game space only by viewing the game image displayed on the second display means.

BRIEF DESCRIPTION OF THE DRAWINGS

These and other features and advantages will be better and more completely understood by reference to the following detailed description of exemplary illustrative embodiments in conjunction with the drawings of which:

FIG. 2 is an external view of a portable game machine (GBA) 50;

FIG. 5 is an illustration showing an overview of a game space;

FIG. 8 is an illustration showing positions of a camera and a light in the case where the player object is located in the GC world;

FIG. 12 is an illustration showing positions of the camera and the light in the case where the player object is located in the GBA world;

FIG. 15 is a memory map of a DVD 30;

FIG. 16 is an illustration showing in detail a part of the memory map of the DVD 30;

DETAILED DESCRIPTION

With reference to the attached drawings, a game system according to an exemplary illustrative embodiment is described below.

Figure 1:
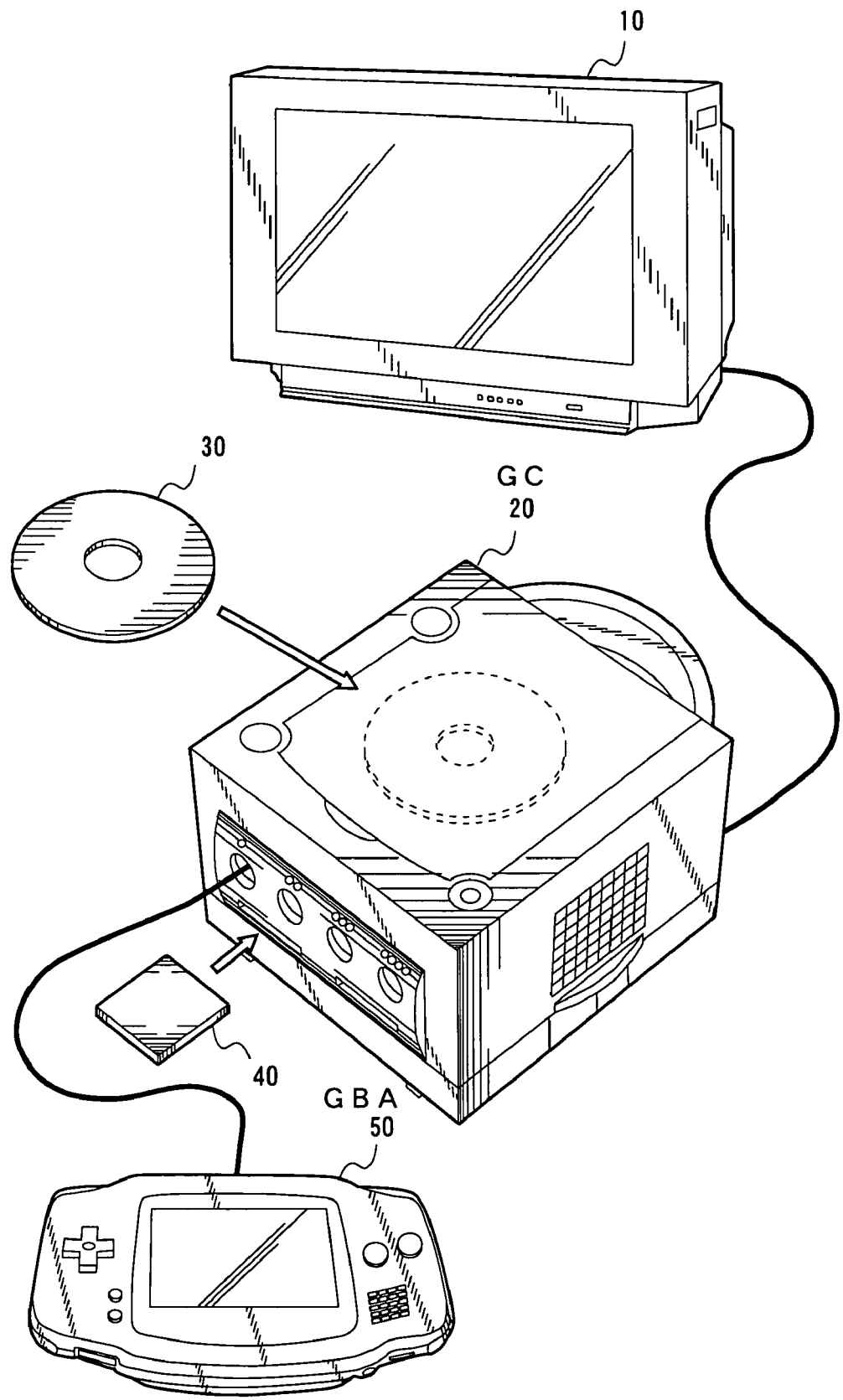
FIG. 1 is an external view of a game system according to an exemplary illustrative embodiment.

FIG. 1 illustrates an external view of the game system. A non-portable game console (hereinafter also referred to as GC) 20 has removably set therein a DVD 30 storing a game program, etc. and, based on the game program, performs game processing. Image data generated through game processing is output to a TV monitor 10, and a game image based on the image data is displayed on a screen of the TV monitor 10. Also, the non-portable game console 20 has removably inserted therein an external memory card 40 as required. This external memory card 20 can store data generated in the course of the game processing as required. Furthermore, the non-portable game console 20 has connected via a communication cable thereto a portable game machine (hereinafter also referred to as GBA) as a controller operated by a player. With reference to FIG. 2, the portable game machine 50 is described in more detail below.

As illustrated in FIG. 2, the portable game machine 50 is provided with a plurality of operation switches 501a through 501d. The portable game machine 50 reports the states of these operation switches (e.g., information about which switch is being pressed) to the non-portable game console 20 via the communication cable, thereby serving as the controller of the non-portable game console 20. Furthermore, not merely serving as the controller, the portable game machine 50 performs game processing based on a game program stored in a game cartridge 60 removably inserted in the portable game machine 50. Based on image data generated through game processing, a game image is displayed on an LCD 502 provided on the portable game machine 50. Also, based on audio data generated through game processing, a game sound (BGM, sound effect, etc.) is produced from a loudspeaker 503.

Note that communication between the non-portable game console 20 and the portable game machine 50 is performed not necessarily via the communication cable, but can also be performed wirelessly.

Figure 3:
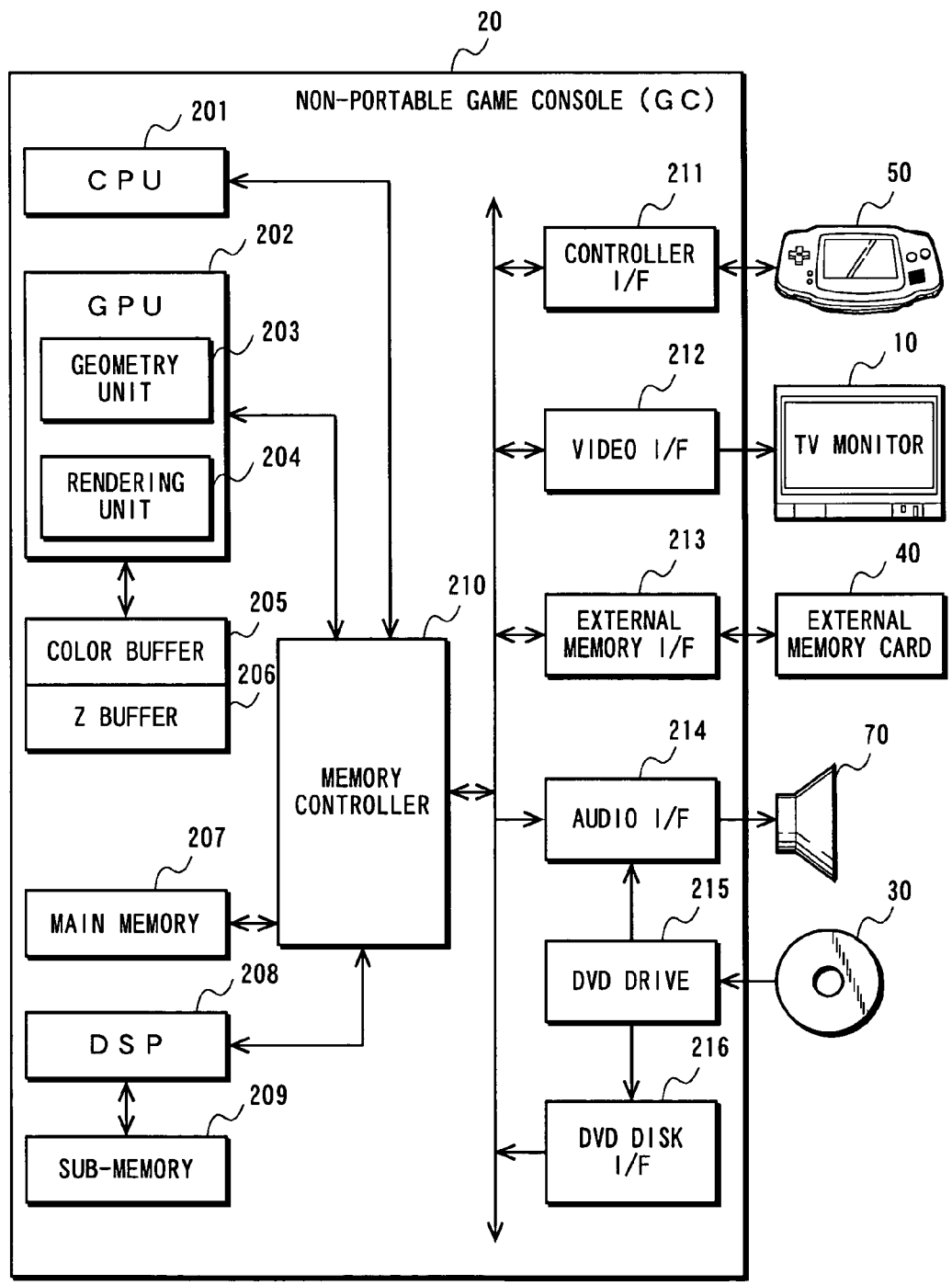
FIG. 3 is a block diagram illustrating the configuration of a non-portable game console (GC) 20.

The internal configuration of the non-portable game console 20 is described below. As illustrated in FIG. 3, the non-portable game console 20 is provided with a CPU 201 for performing game processing based on the game program, a GPU 202 for performing an image generating process with the use of a geometry unit 203 and a rendering unit 204, a color buffer 205 and a Z buffer 206 for use in image processing, a main memory 207, a DSP for mainly performing audio processing and a sub-memory 209 used therefor, a memory controller 210 for controlling data transfer among the units, a controller I/F 211 enabling exchanges of signals with the portable game machine 50, a video I/F 212 enabling exchanges of signals with the TV monitor 10, an external memory I/F enabling exchanges of signals with the external memory card 40, an audio I/F 214 enabling exchanges of signals with a loudspeaker 70, a DVD drive 215 for reading/writing data from/in the DVD 30, and a DVD disk I/F 216 enabling exchanges of signals with the DVD 30.

Figure 4:
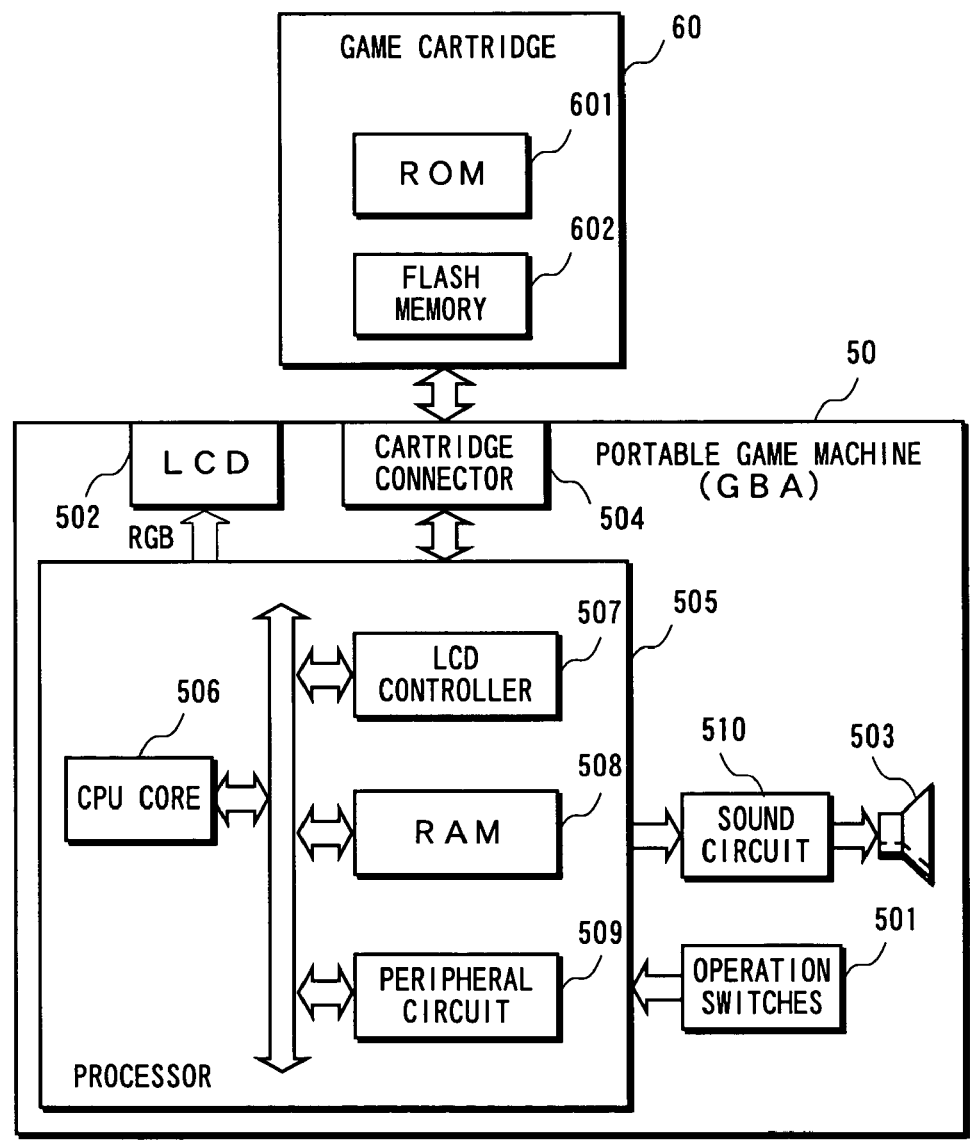
FIG. 4 is a block diagram illustrating the configuration of the portable game machine (GBA) 50.

The internal configurations of the portable game machine 50 and the game cartridge 60 are described below. As illustrated in FIG. 4, the game cartridge 60 is integrally provided with a ROM 601 and a flash memory 602. The ROM 601 has recorded thereon a game program, etc. The flash memory 602 is a non-volatile memory in which data generated in the course of the game processing can be stored as required. The portable game machine 50 includes a cartridge connector 504 to which the game cartridge 60 is inserted, an LCD 502 on which game images are displayed, a processor 505, a sound circuit 510, a loudspeaker 503, and operation switches 501 (including the operation switches 501a through 501d). The processor 505 includes a CPU core 506 for signal processing, an LCD controller 507 for driving the LCD 502, a RAM 508 serving as a working memory temporarily used for signal processing and image processing, and a peripheral circuit 509.

The above-structured non-portable game console 20 and the portable game machine 50 exchange game data with each other, perform game processing based on the game programs stored in the DVD 30 and the ROM 601, respectively, and then output game images generated through game processing to the TV monitor 10 and the LCD 502, respectively. The specific operation of an exemplary illustrative game system is described below.

FIG. 5 is an illustration three-dimensionally showing a virtual space in the game played in an exemplary illustrative game system. As illustrated in FIG. 5 this virtual space is broadly divided into two worlds. A first world is an upper world whose Y coordinate is approximately 0 or larger, while a second world is a lower world whose Y coordinate is approximately −10. In the example of FIG. 5, the upper world includes a ladder to the sky, a character operated by the player, clouds, a bird, etc., while the lower world includes monsters, houses, castles, ground, etc. In an exemplary illustrative game system, the upper world is supported by the non-portable game console 20, while the lower world is supported by the portable game machine 50. It is assumed herein that the non-portable game console 20 handles a three-dimensional game space and displays a three-dimensional game image on the TV monitor, while the portable game machine 50 handles a two-dimensional game space and displays a two-dimensional game image and displays a two-dimensional game space on the LCD 502.

Figure 6:
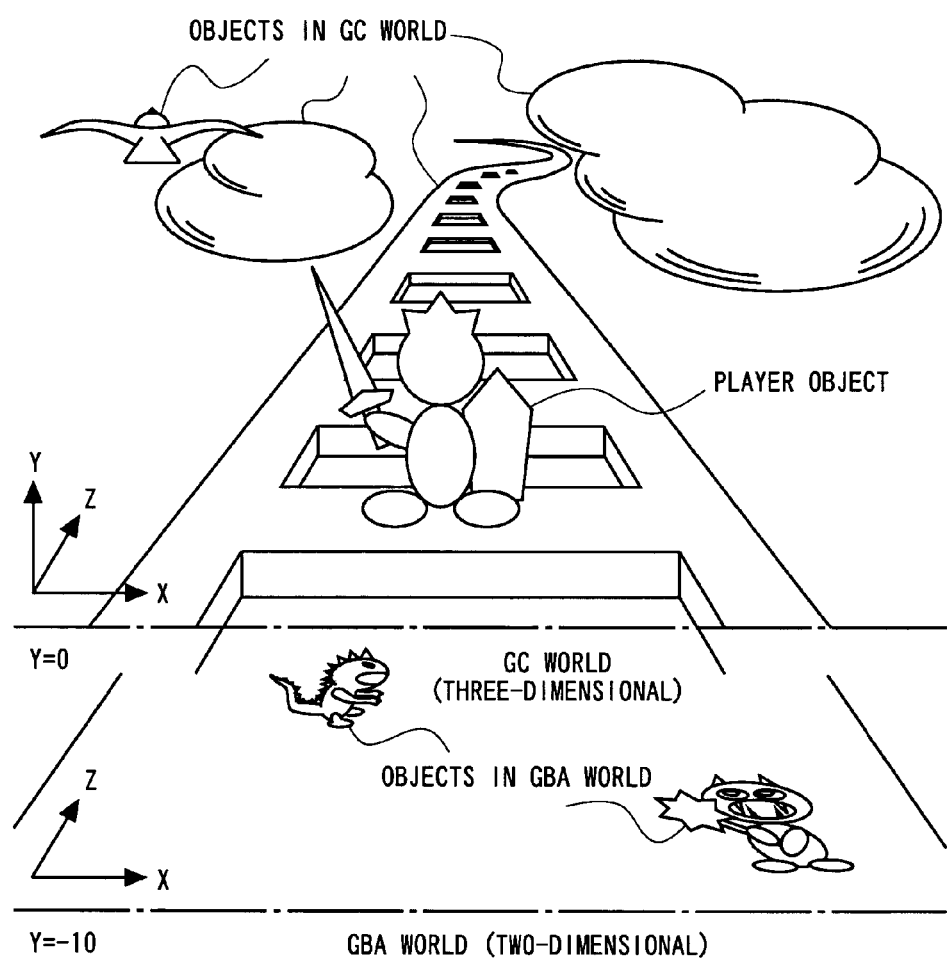
FIG. 6 is an illustration showing a GC world and a GBA world in a case where a player object is located in a GC world.

FIG. 6 schematically illustrates the game spaces handled by the non-portable game console (GC) 20 and the portable game machine (GBA) 50. In the three-dimensional game space (hereinafter referred to as a GC world) handled by the non-portable game console 20, coordinates of each object are represented as (X, Y, Z). On the other hand, in the two-dimensional game space (hereinafter referred to as a GBA world) handled by the portable game machine 50, there is no concept of height, and therefore coordinates of each object are represented as (X, Z). However, when a process corresponding to a virtual positional relationship with the GC world is required, a height of Y=−10 is assumed for each object located in the GBA world. In FIG. 6, the player object is located in the GC world, and will fall down to the GBA world if falling from the ladder.

Figure 7A:
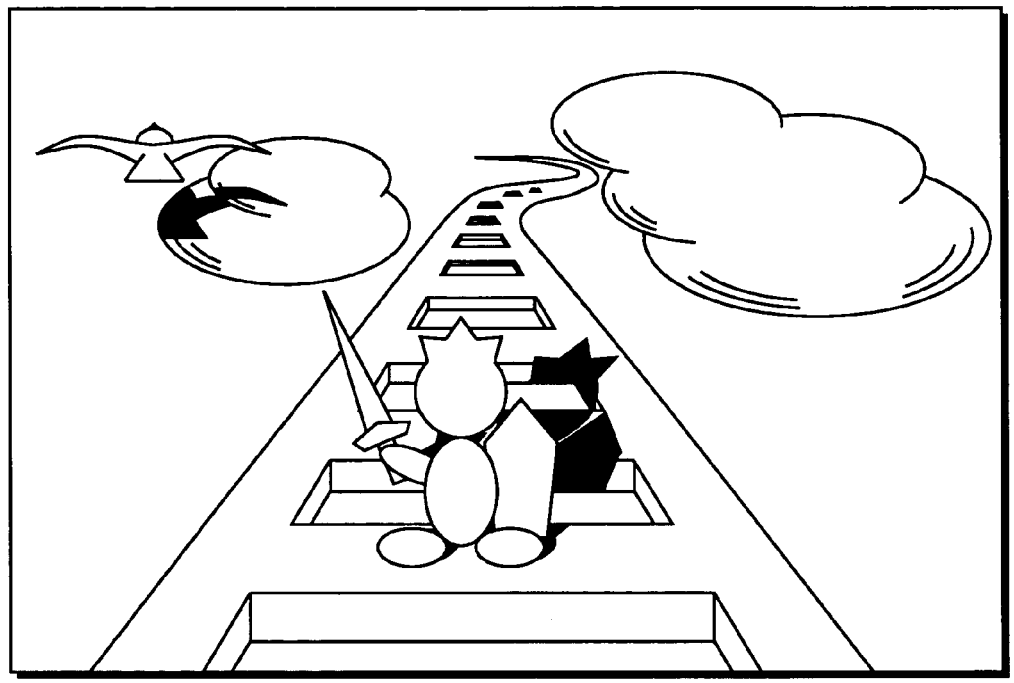
FIGS. 7A and 7B are illustrations showing game screens output from a TV monitor 10 and an LCD 502, respectively, in the case where the player object is located in the GC world.
Figure 7B:
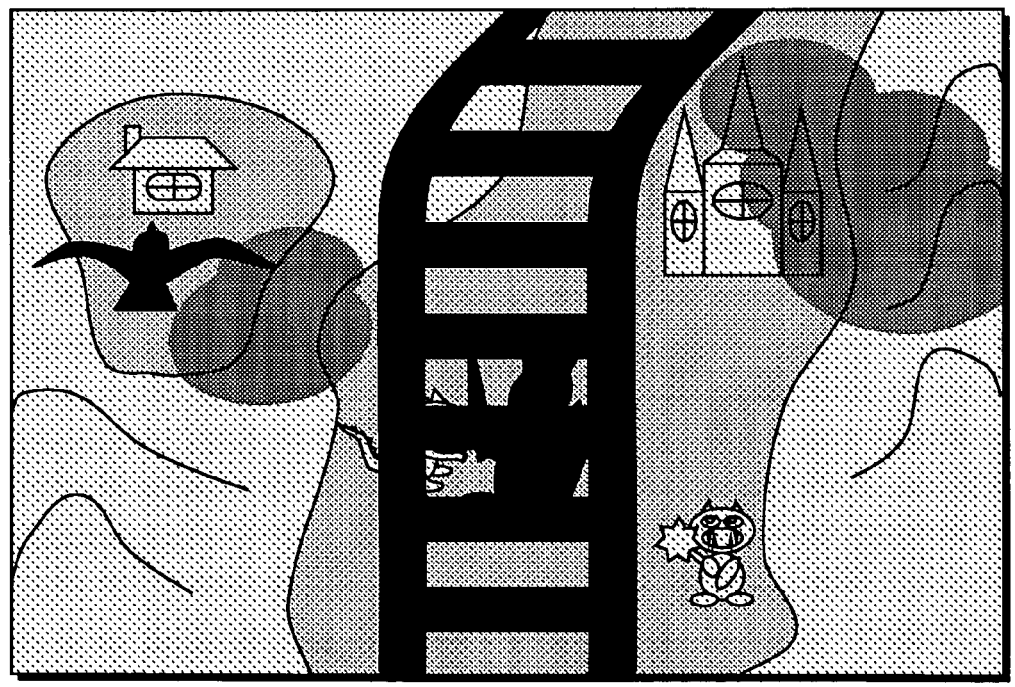

FIGS. 7A and 7B illustrate, respectively, an example of a game image generated by the non-portable game console 20 and then displayed on the TV monitor 10 and an example of a game image generated by the portable game machine 50 and then displayed on the LCD 502 in a case where the player object is located in the GC world. As illustrated in FIG. 7A, the TV monitor 10 has displayed thereon the three-dimensional GC world comprising the objects located in the GC world and also their shadows. On the other hand, as illustrated in FIG. 7B, the LCD 502 has displayed thereon the two-dimensional GBA world together with the shadows of objects located in the GC world (the player character, the ladder to the sky, clouds, the bird, etc.). With this, compared with a case where no shadows are displayed, the player can easily know a positional relationship between, for example, a monster located in the GBA world and the player character located in the GC world. Furthermore, as illustrated in FIG. 7B, the entire game screen on the LCD 502 is dimmed more than normal. This effectively enables the user to recognize that the player character is located not in the GBA world but in the GC world.

FIG. 8 indicates positions of a camera and a light (e.g., a light source) placed in the GC world in the case where the player object is located in the GC world. As such, while the player object is located in the GC world, the camera is placed so as to look down at the player object from the back, while the light is placed at a positions lightly distanced from the camera. The non-portable game console 20 causes a scene including the player character viewed from the camera to be displayed on the TV monitor 10, together with shadows appearing in accordance with the position of the light. In order to display such shadows, an arbitrary known scheme, such as the shadow map technique or the shadow volume technique, can be used.

Figure 9:
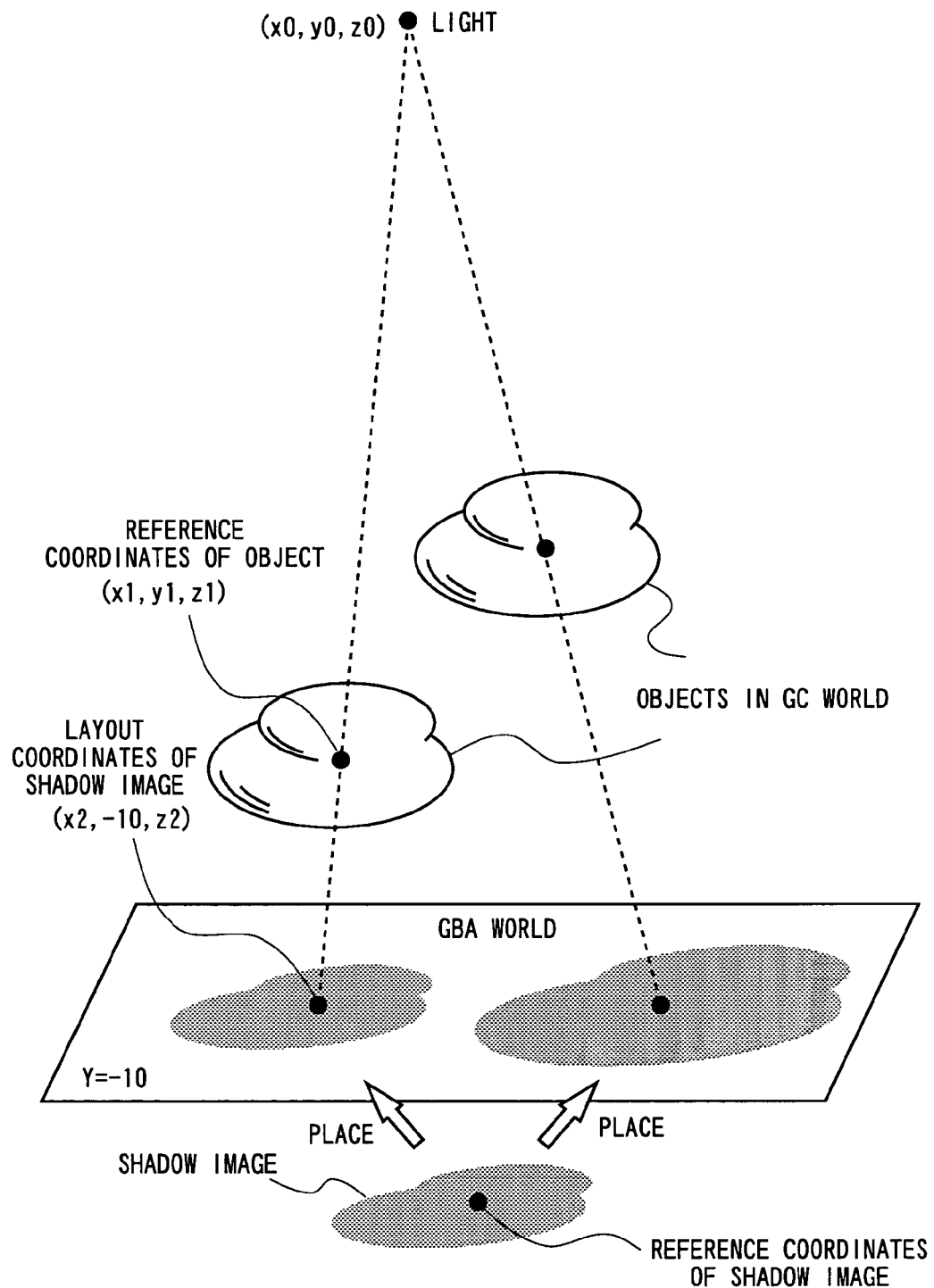
FIG. 9 is an illustration for describing a process of displaying shadows of objects located in the GC world in the GBA world.

On the other hand, the shadows illustrated in FIG. 7B are displayed in a manner different from that used in the GC world. With reference to FIG. 9, a scheme of displaying in the GBA world the shadows of the objects located in the GC world is described below. Instead of generating a shadow image based on the shape of each object located in the GC world every time a shadow is to be displayed, the portable game machine 50 uses a shadow image generated in advance for each object to display a shadow in the GBA world. More specifically, as illustrated in FIG. 9, from the coordinates (x0, y0, z0) of the light placed in the GC world and reference coordinates (x1, y1, z1) of an object located in the GC world, layout coordinates (x2, z2) of a shadow image in the GBA world (Y plane of −10) are calculated. Then, the shadow image is placed so that these layout coordinates and the reference coordinates of the shadow image coincide with each other. At this time, when the light is a point source of light, the size of the shadow image is enlarged or reduced in accordance with the height represented by y1 of the object located in the GC world. That is, the shadow image is enlarged when y1 represents a large value, and is reduced when y1 represents a small value. With this, a more realistic shadow is displayed. In the example of FIG. 9, the layout coordinates of the shadow image are calculated based on both of the coordinates of the light and the coordinates of the object. However, when rays of light from the light source are approximated to parallel rays, for example, the layout coordinates of the shadow image can be calculated from only the coordinates of the object located in the GC world.

Figure 10:
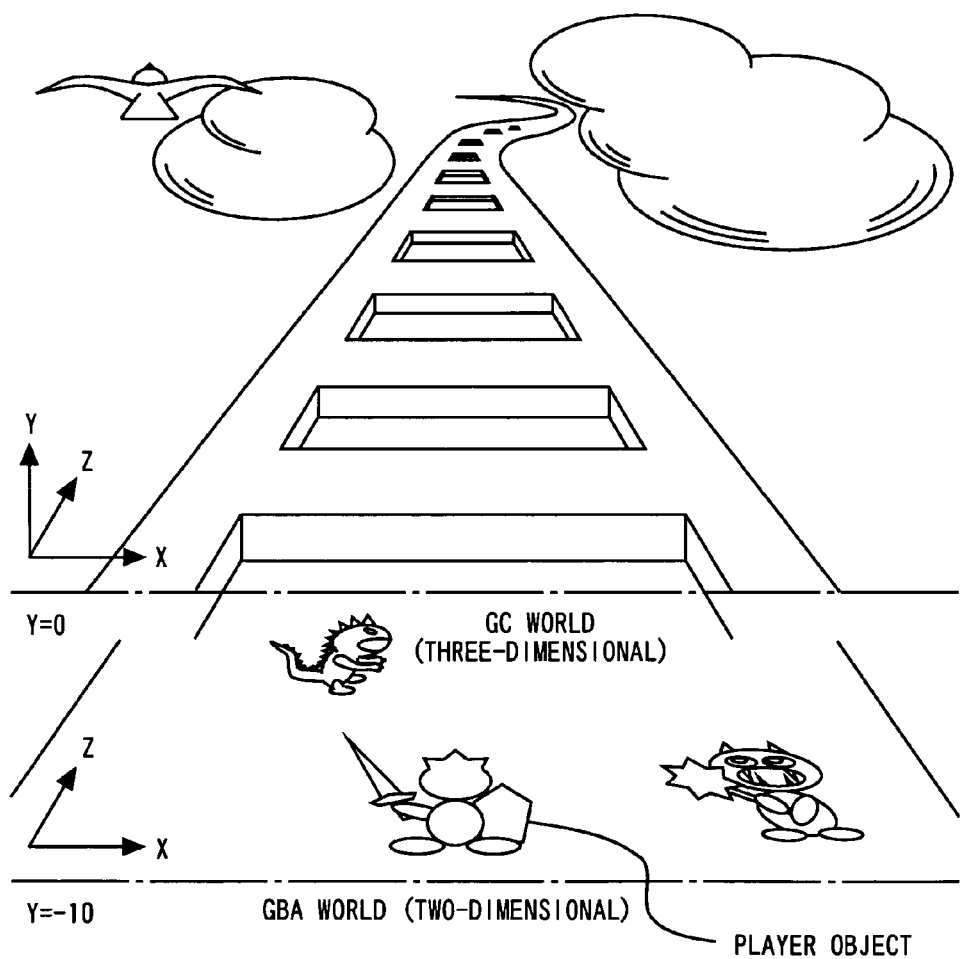
FIG. 10 is an illustration showing the GC world and the GBA world in the case the player object is located in the GBA world.

Next, descriptions are made to a case where the player object falls down (that is, moves) from the GC world to the GBA world. FIG. 10 schematically illustrates the game spaces handled by the non-portable game console (GC) 20 and the portable game machine (GBA) 50 in the case where the player object is located in the GBA world. Although the player object is located in the GBA world in FIG. 10, the player object can return to the GC world when the player object is overlaid on the ladder object to go up to the GC world.

Figure 11A:
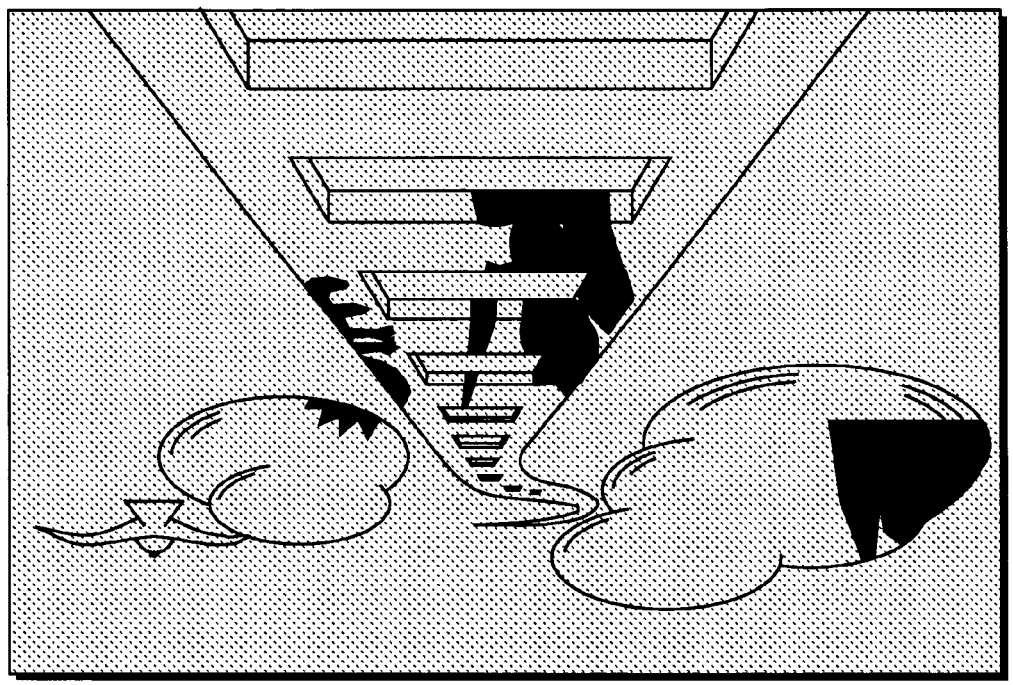
FIGS. 11A and 11B are illustrations showing game screens output from the TV monitor 10 and the LCD 502, respectively, in a case where the player object is located in the GBA world.
Figure 11B:
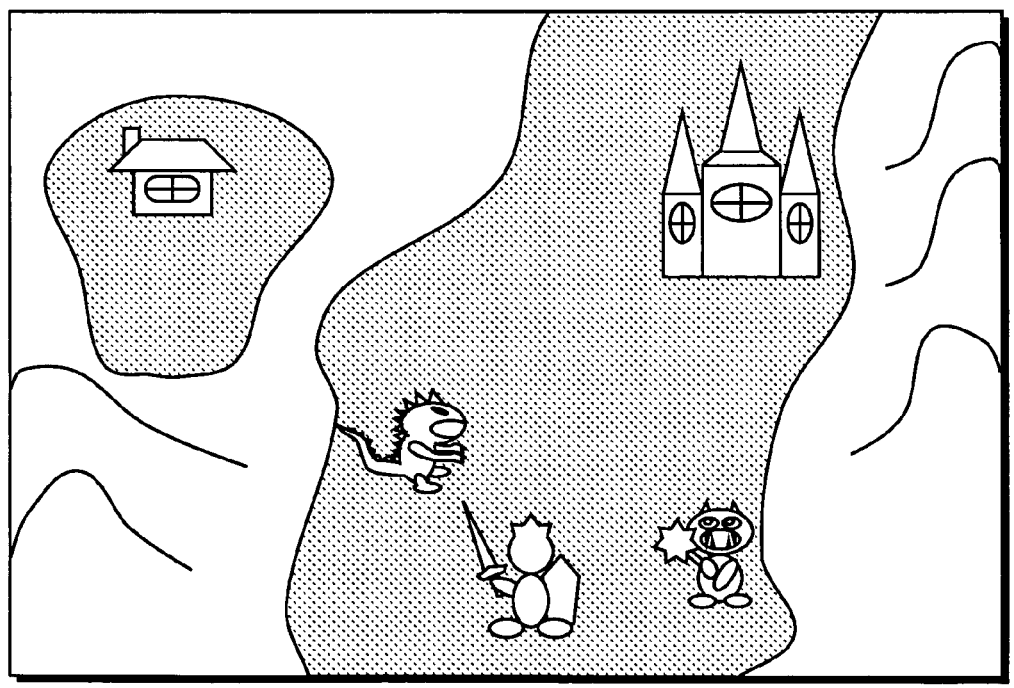

FIGS. 11A and 11B illustrate, respectively, an example of the game image generated by the non-portable game console 20 and then displayed on the TV monitor 10 and an example of the game image generated by the portable game machine 50 and then displayed on the LCD 502 in the case where the player object is located in the GBA world. As illustrated in FIG. 11A, the TV monitor 10 has displayed thereon the three-dimensional GC world together with the shadows of the objects located in the GBA world (monsters, a castle, the player character, etc.). With this, compared with a case where no shadows are displayed, the player can easily know a positional relationship between, for example, the player character located in the GBA world and the ladder to the sky located in the GC world. Furthermore, as illustrated in FIG. 11A, the game screen displayed on the TV monitor 10 shows the state of the GC world viewed from the bottom. That is, the TV monitor 10 has displayed thereon a scene viewed by the player character when looking up. Therefore, when the player operating the player character displayed on the LCD 502 of the portable game machine 50 looks from the portable game machine 50 on hand to the TV monitor 10 in order to check the state of the GC world, the player can comfortably check the state of the GC world as if the player had become the player character in the game. This effect can be increased by placing the camera near the player character. Also, such display enables the player to instantaneously recognize that the player character is not located in the GC world. Still further, as illustrated in FIG. 11A, the entire game screen on the TV monitor 10 is dimmed more than normal. This effectively enables the user to recognize that the player character is located not in the GC world but in the GBA world. Still further, if the player character inadvertently fell down from the GC world to the GBA world, the player can instantaneously recognize this because the screen is dimmed. Still further, if the player character inadvertently fell down from the GC world to the GBA world, the player can instantaneously recognize that falling because the screen becomes dimmed. On the other hand, as illustrated in FIG. 11B, the LCD 502 has displayed thereon the two-dimensional GBA world including the player character. At this time, unlike FIG. 7B, the brightness of the game screen on the LCD 502 is normal.

FIG. 12 illustrates the positions of the camera and the light placed in the GC world in the case where the player object is located in the GBA world. As illustrated, when the player object is located in the GBA world, the camera is placed so as to look up at the player from the back, while the light is placed at a position slightly distanced from the camera.

Figure 13:
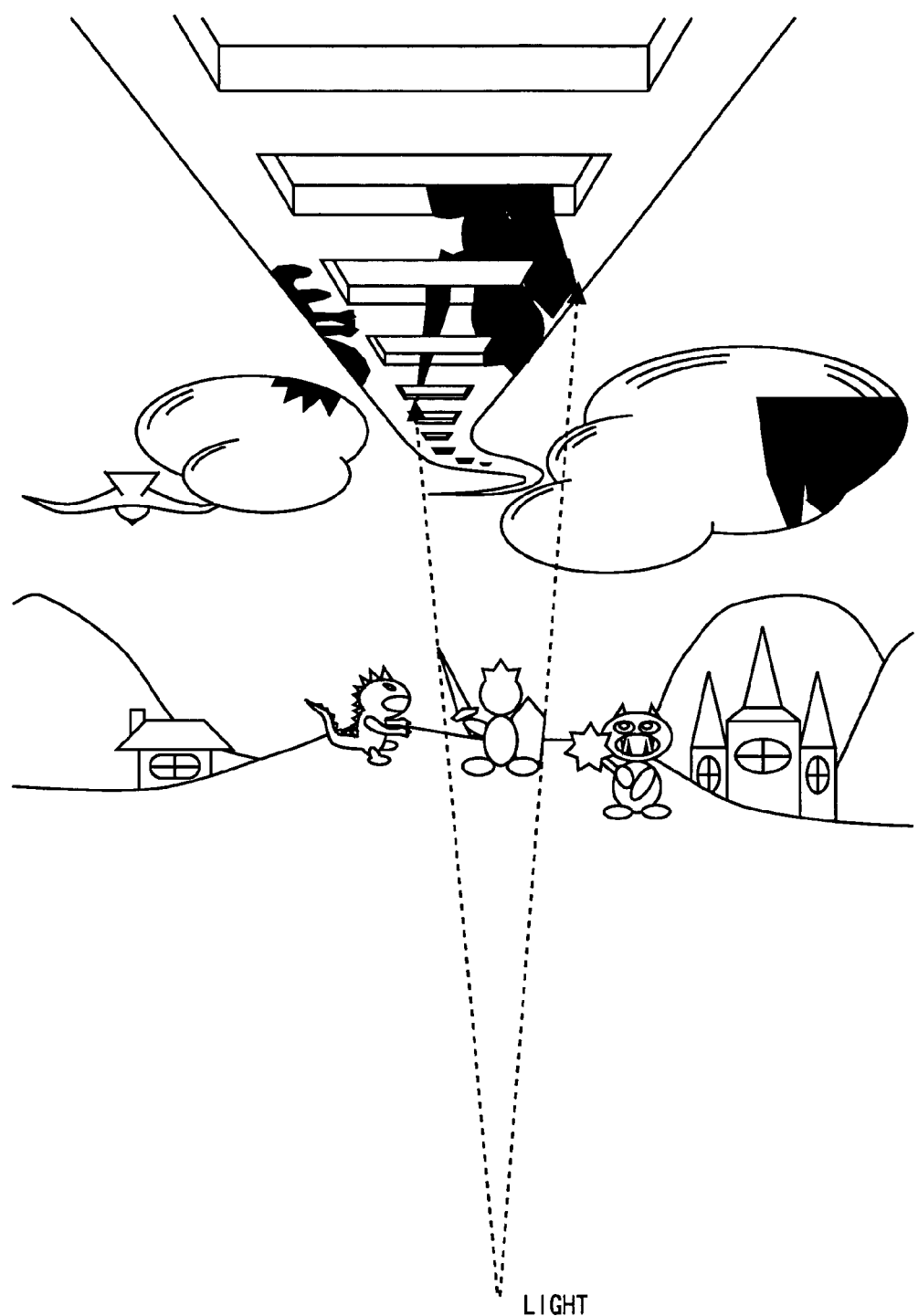
FIG. 13 is an illustration showing a state in which objects located in the GBA world cast shadows on objects located in the GC world.
Figure 14:
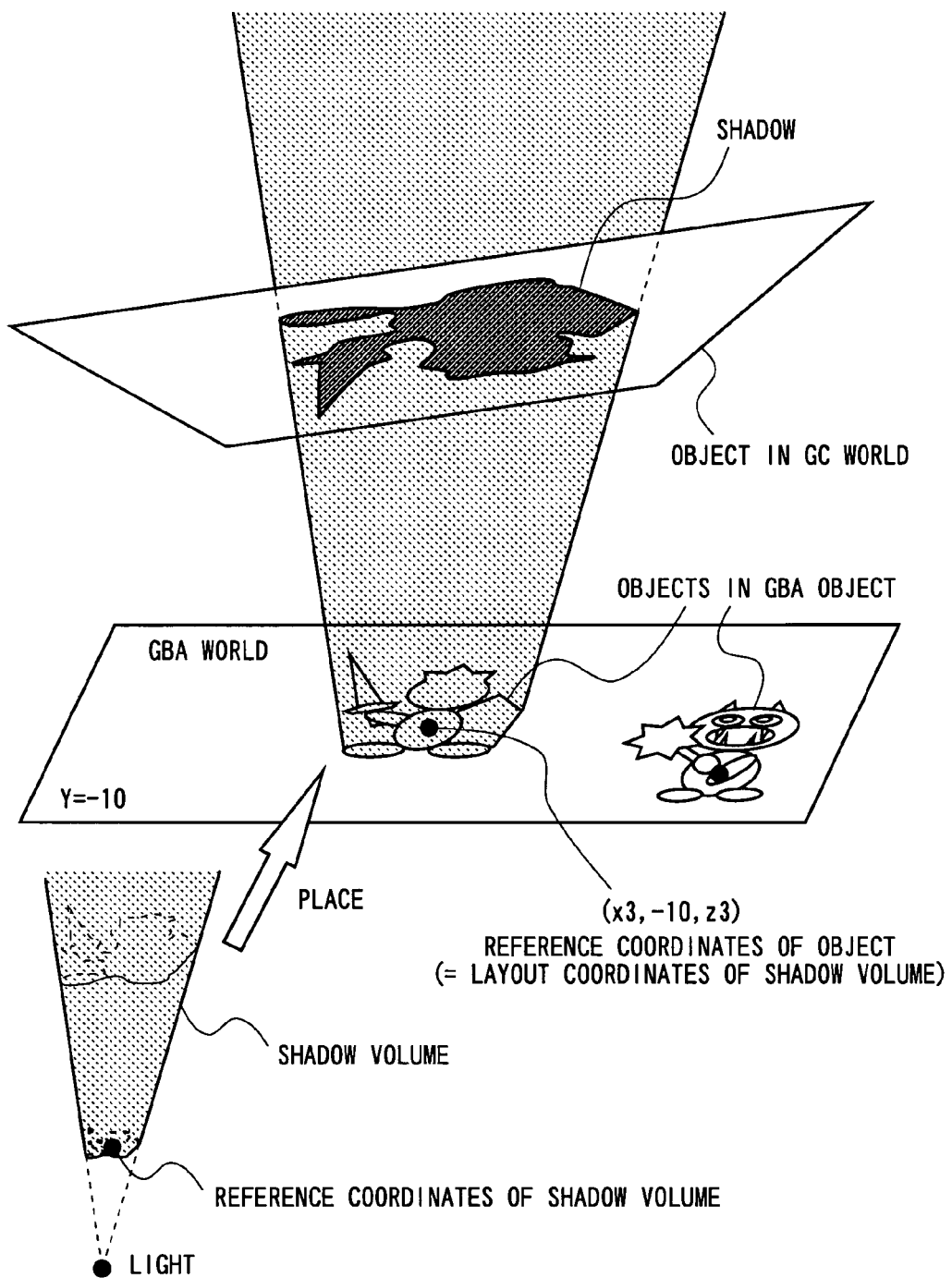
FIG. 14 is an illustration for describing a process of displaying in the GC world the shadows of the object located in the GBA world.

A scheme of displaying the shadows illustrated in FIG. 11A is described below. The shadows illustrated in FIG. 11A can be displayed in the GC world as illustrated in FIG. 13 by virtually placing in the GC world the objects located in the GBA world as three-dimensional objects and then performing a known scheme, such as the shadow map technique or the shadow volume technique, based on the shapes of these three-dimensional objects and the position of the light. In this case, however, the three-dimensional objects corresponding to the objects located in the GBA world have to be provided in advance to the non-portable game console 20. Based on these three-dimensional objects, shadow volumes are generated, thereby performing a shadow rendering process. Therefore, in certain exemplary illustrative embodiments, in order to reduce the processing load, a shadow volume is generated for each object located in the GBA world, and data of the generated shadow volume is then provided in advance to the non-portable game console 20. By using the shadow volume, a shadow is displayed. More specifically, when reference coordinates of an object located in the GBA world are (x3, z3), for example, these coordinates are reported from the portable game machine 50 to the non-portable game console 20. The non-portable game console 20 then places a shadow volume corresponding to that object so that the reference coordinates of the shadow volume coincide with the coordinates in the GC world of (x3, −10, y3). Based on the placed shadow volume, a shadow of the object located in the GBA world is displayed in the GC world. With this, a shadow volume is not required to be generated every time a shadow is to be displayed. Therefore, the processing load for displaying a shadow can be reduced. Note that, when a shadow is displayed by using the shadow volume, a stencil buffer not shown in FIG. 3 is used as required. Also, instead of the shadow rendering scheme using the shadow volume illustrated in FIG. 14, a shadow map can be used. In this case, by way of example, as for the object located at (x3, −10, y3) in the GBA world, a polygon having a shape corresponding to the outline of this object is first placed at (x3, −1, z3), and then a shadow mapping process is performed.

Next, a memory map of each storage used in an exemplary illustrative game system is described.

FIG. 15 illustrates a memory map of the DVD 30. In the DVD 30, various object-moving programs, various rendering program, and other programs for game processing are stored as program data. The object-moving programs are programs for moving objects. The rendering programs are programs for rendering objects. Here, the stored object-moving programs are a program for moving the player object, a program for moving simple-motion objects in the GC world, a program for moving complex-motion objects in the GC world, and a program for moving simple-motion objects in the GBA world. A simple-motion object is an object which moves within a game space in a simple manner based on a predetermined motion pattern (for example, the clouds illustrated in FIG. 6 that are flowing to a predetermined direction). A complex-motion object is an object whose motion pattern is changed at random or in accordance with the situation, and therefore it is difficult to predict where the object goes (for example, the bird illustrated in FIG. 6). In the program for moving the simple-motion objects in the GC world and the program for moving the simple-motion objects in the GBA world, data defining a motion pattern is provided for each simple-motion object, as illustrated in FIG. 16. The stored rendering programs are a program for rendering the player object, a program for rendering simple-motion objects in the GC world, a program for rendering complex-motion objects in the GC world, a program for rendering fixed objects in the GC world, a program for rendering terrain objects in the GC world, a program for rendering shadows of the objects in the GC world, a program for rendering simple-motion objects in the GBA world, a program for rendering complex-motion objects in the GBA world, and a program for rendering fixed objects in the GBA world. A fixed object is an object always located at a certain position in a game space (for example, the ladder to the sky illustrated in FIG. 6).

The DVD 30 also stores layout data (coordinate data) of terrain objects located in the GC world (however, in the example of FIG. 6, no terrain objects are located in the GC world).

Furthermore, the DVD 30 stores coordinate data of each fixed object located in the GC world and coordinate data of each fixed object located in the GBA world.

Still further, the DVD 30 stores polygon/texture data. The polygon/texture data includes polygon/texture data of the player object, polygon/texture data of the simple-motion objects in the GC world, polygon/texture data of the complex-motion objects in the GC world, polygon/texture data of the fixed objects in the GC world, and polygon/texture data of the terrain objects in the GC world.

Still further, the DVD 30 stores shadow volume data. The shadow volume data includes shadow volume data for displaying a shadow of the player object, shadow volume data for displaying shadows of the simple-motion objects in the GBA world, shadow volume data for displaying shadows of the complex-motion objects in the GBA world, and shadow volume data for displaying shadows of the fixed objects in the GBA world.

Still further, the DVD 30 stores other data, such as sound data.

In the GC world displayed on the TV monitor 10, the objects located in the GBA world are not displayed, but only their shadows are displayed. Therefore, the polygon/texture data corresponding to those objects located in the GBA world is not stored in the DVD 30. Instead, the shadow volume data corresponding to the objects located in the GBA world is stored.

Figure 17:
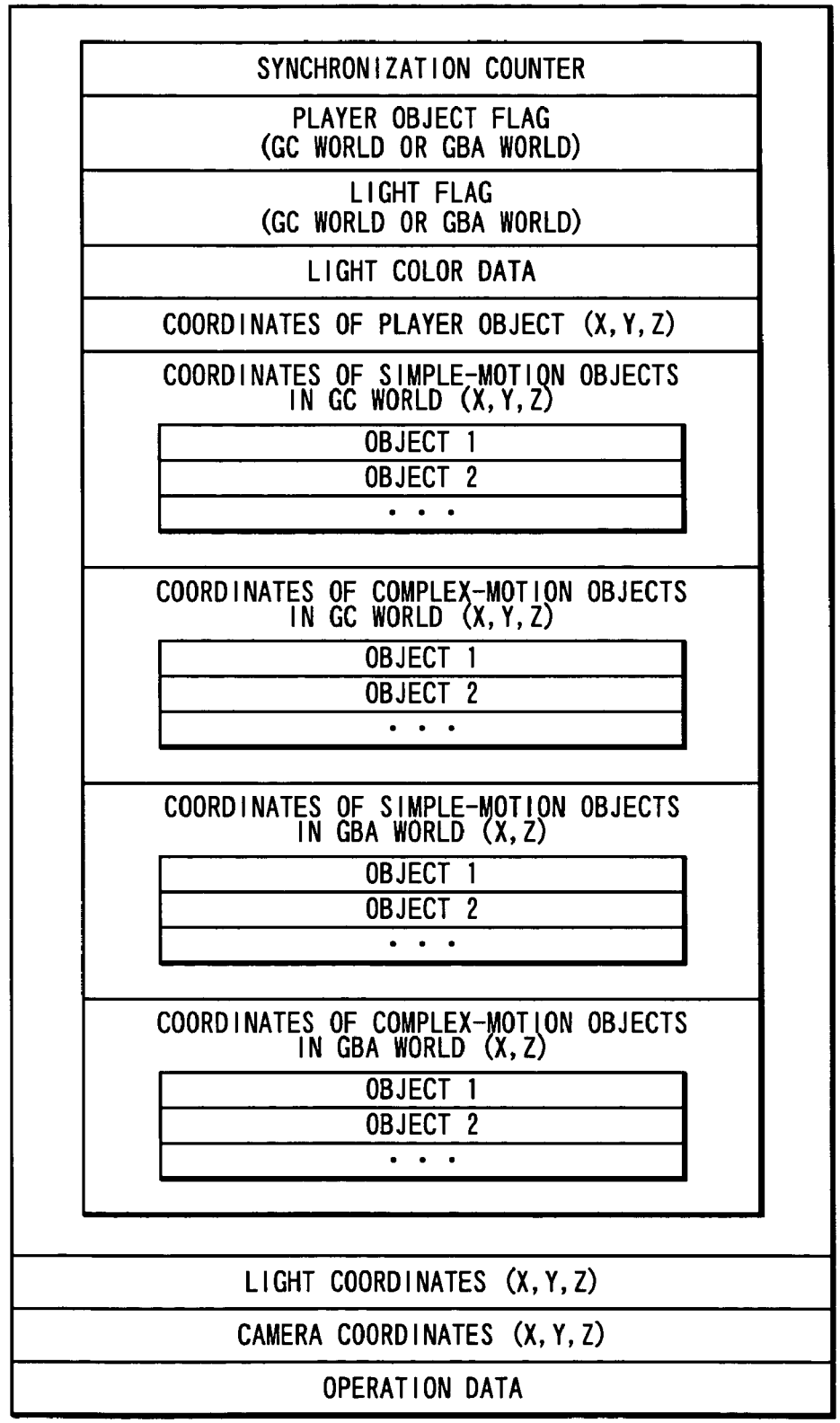
FIG. 17 is a memory map of a main memory 207 internally provided to the non-portable game console (GC)

FIG. 17 illustrates a memory map of the main memory 207 of the non-portable game console 20. The main memory 207 is allocated so as to have various areas. The areas include, as required, an area for storing a value of a synchronization counter for synchronization with the portable game machine 50, an area for storing a player object flag indicative of in which world, e.g., the GC world or the GBA world, the player object is currently located, an area for storing a light flag indicative of in which world, e.g., the GC world or the GBA world, the light is located (that is, indicative of whether the GC world is lit up from above or below), an area for storing light color data used for changing the brightness of the light, an area for storing the coordinates of the player object, an area for storing the coordinates of each simple-motion object in the GC world, an area for storing the coordinates of each complex-motion object in the GC world, an area for storing the coordinates of each simple-motion object in the GBA world predicted based on the motion pattern, and an area for storing the coordinates of each complex-motion object in the GBA world received from the portable game machine 50.

Also, the main memory 207 is allocated so as to have, as required, an area for storing the coordinates of the light, an area for storing the coordinates of the camera, and an area for storing operation data received from the portable game machine 50.

Figure 18:
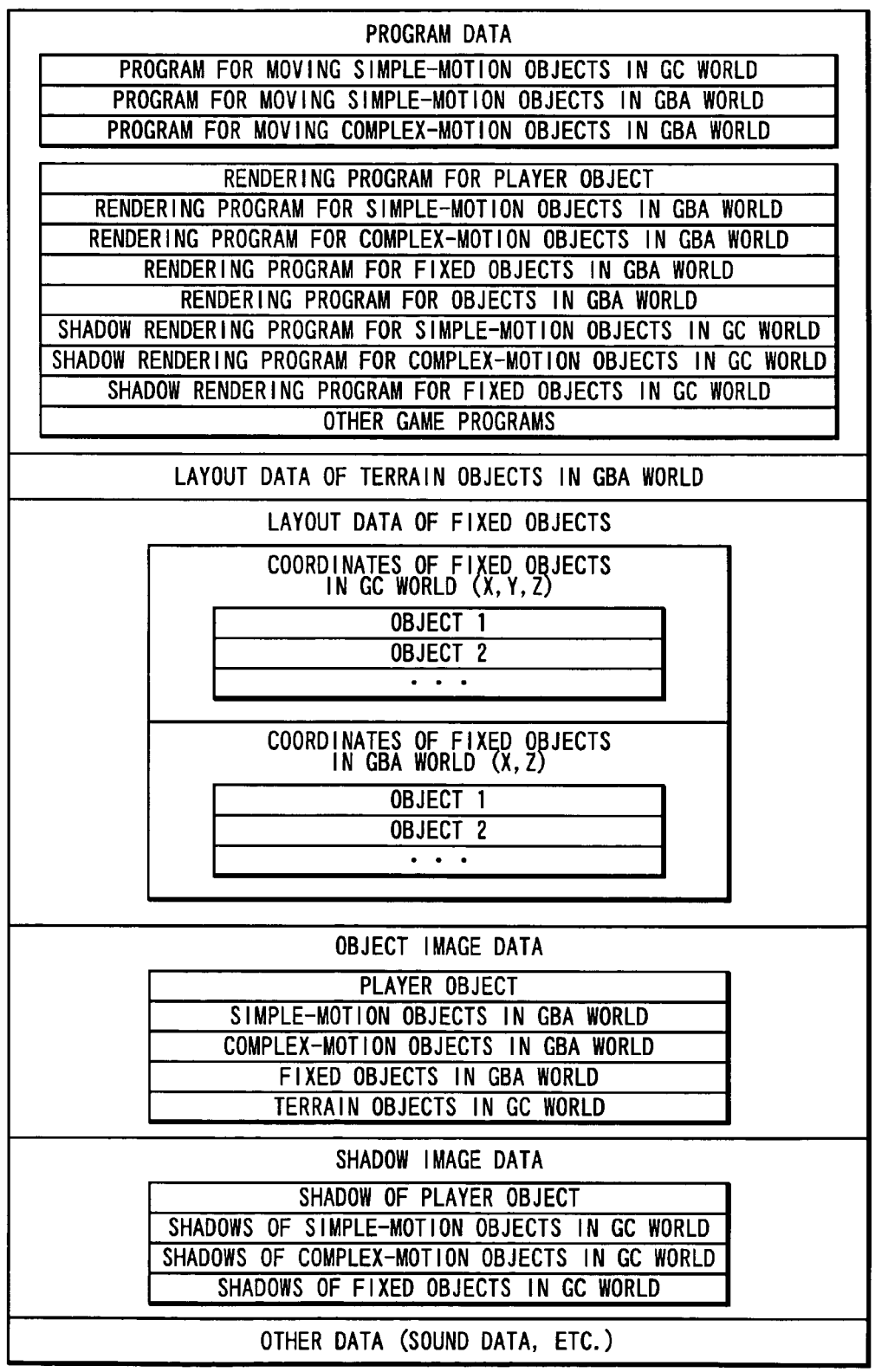
FIG. 18 is a memory map of a ROM 601 internally provided to the game cartridge 60.
Figure 19:
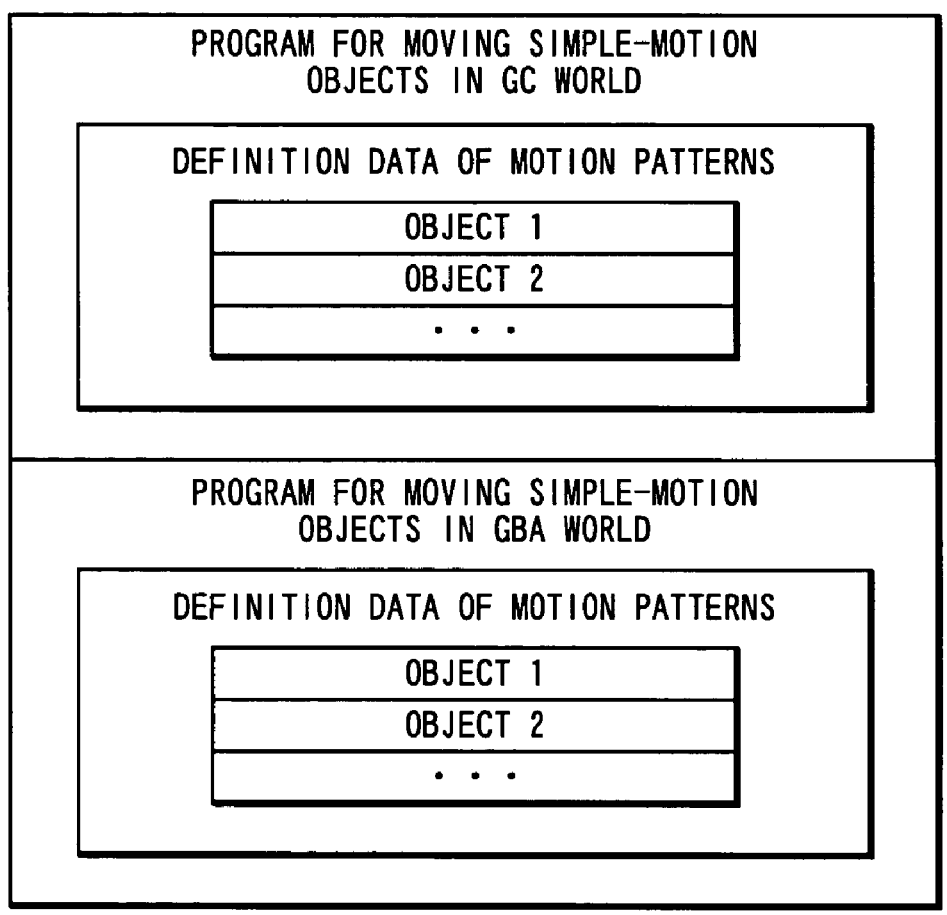
FIG. 19 is an illustration showing in detail a part of the memory map of the ROM 601 of the game cartridge 60.

FIG. 18 illustrates a memory map of the ROM 601 of the game cartridge 60. The ROM 601 stores program data including various object-moving programs, various rendering programs, and other programs for game processing, all of which have been described above with reference to FIG. 15, and are therefore not described herein. Here, since a process of controlling the movement of the player object is performed at the non-portable game console 20 side, no program for moving the player object is stored in the ROM 601. However, an exemplary illustrative game system can be structured so that the process of controlling the movement of the player object can be performed at the portable game machine 50 side when the player object is located in the GBA world. In this case, the ROM 601 stores the program for moving the player object. In the program for moving the simple-motion objects in the GC world and the program for moving the simple-motion objects in the GBA world, data defining a motion pattern is provided for each simple-motion object, as illustrated in FIG. 19.

Also, the ROM 601 stores layout data of each terrain object in the GBA world, the coordinates of each fixed object in the GC world, and the coordinates of each fixed object in the GBA world.

Furthermore, the ROM 601 stores various object image data. The object image data includes image data of the player object, image data of the simple-motion objects in the GBA world, image data of the complex-motion objects in the GBA world, image data of the fixed objects in the GBA world, and image data of the terrain objects in the GBA world.

Still further, the ROM 601 stores various shadow image data. The shadow image data includes shadow image data for displaying shadows of the simple-motion objects in the GC world, shadow image data for displaying shadows of the complex-motion objects in the GC world, and shadow image data for displaying shadows of the fixed objects in the GC world. Since the GBA world is a two-dimensional game world, the above-stated shadow data is two-dimensional image data representing shadows.

Still further, the ROM 601 stores other data, such as sound data.

In the GBA world displayed on the LCD 502 of the portable game machine 50, the objects located in the GC world are not displayed, but only their shadows are displayed. Therefore, the object image data corresponding to those objects located in the GC world is not stored in the ROM 601. Instead, the shadow image data corresponding to the objects located in the GC world is stored.

The player character moves between the GC world and the GBA world. Therefore, the DVD 30 stores the polygon/texture data and the shadow volume data of the player object, and the ROM 601 stores the image data and the shadow image data of the player object.

Figure 20:
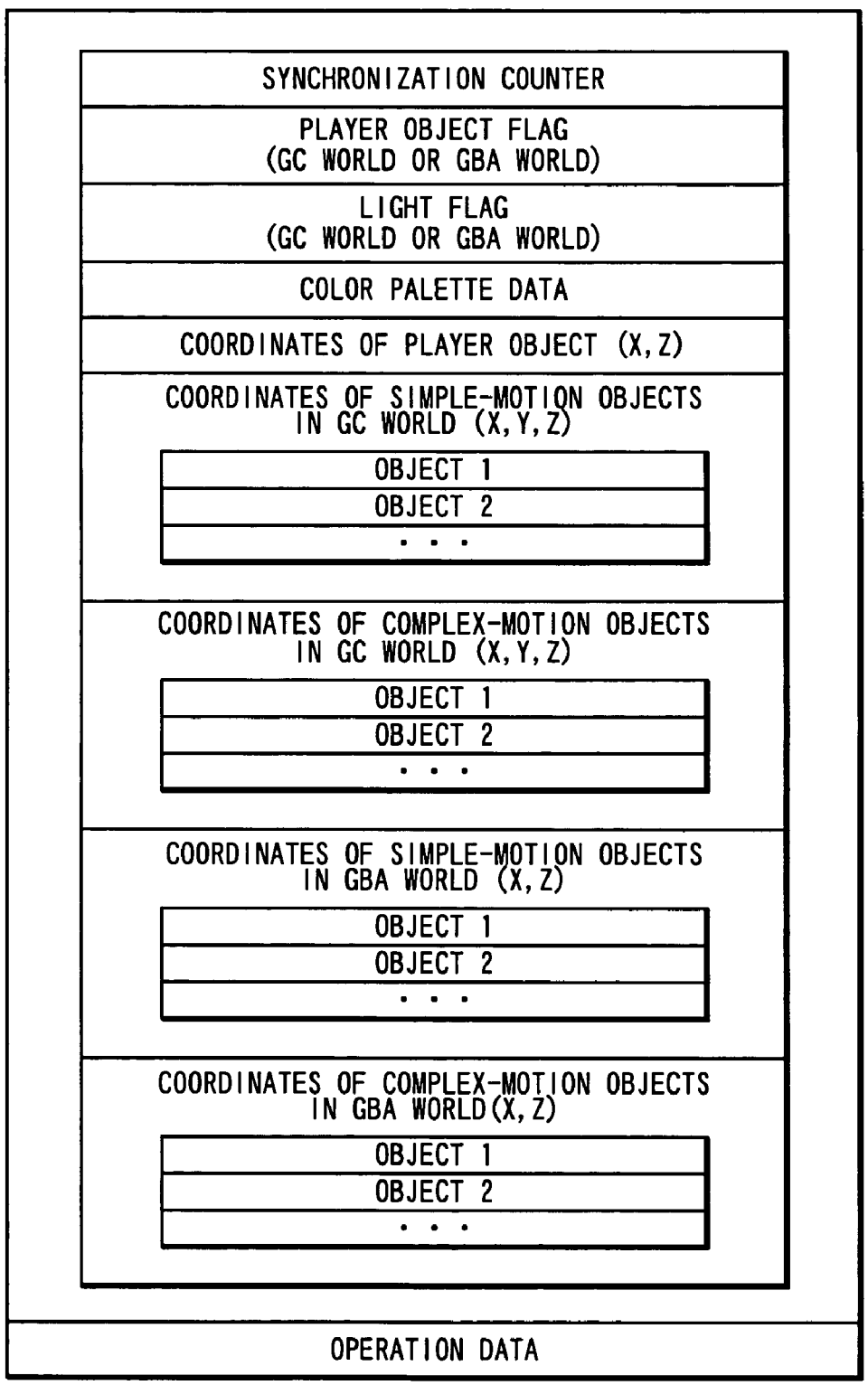
FIG. 20 is a memory map of a RAM 508 internally provided to the portable game machine (GBA) 50.

FIG. 20 illustrates a memory map of the RAM 508 of the portable game machine 50. The RAM 508 is allocated so as to have various areas. The areas include, as required, an area for storing a value of a synchronization counter for synchronization with the non-portable game console 20, an area for storing the player object flag and the light flag received from the non-portable game console 20, an area for storing color palette data for changing the brightness of the game screen, an area for storing the coordinates of the player object received from the non-portable game console 20, an area for storing the coordinates of each simple-motion object in the GC world predicted based on the motion pattern, an area for storing the coordinates of the simple-motion object in the GBA world, and an area for storing the coordinates of each complex-motion object in the GBA world.

Also, the RAM 508 is allocated so as to have, as required, an area for storing the operation data output from the operation switches 501 based on the operation by the player.

Figure 21:
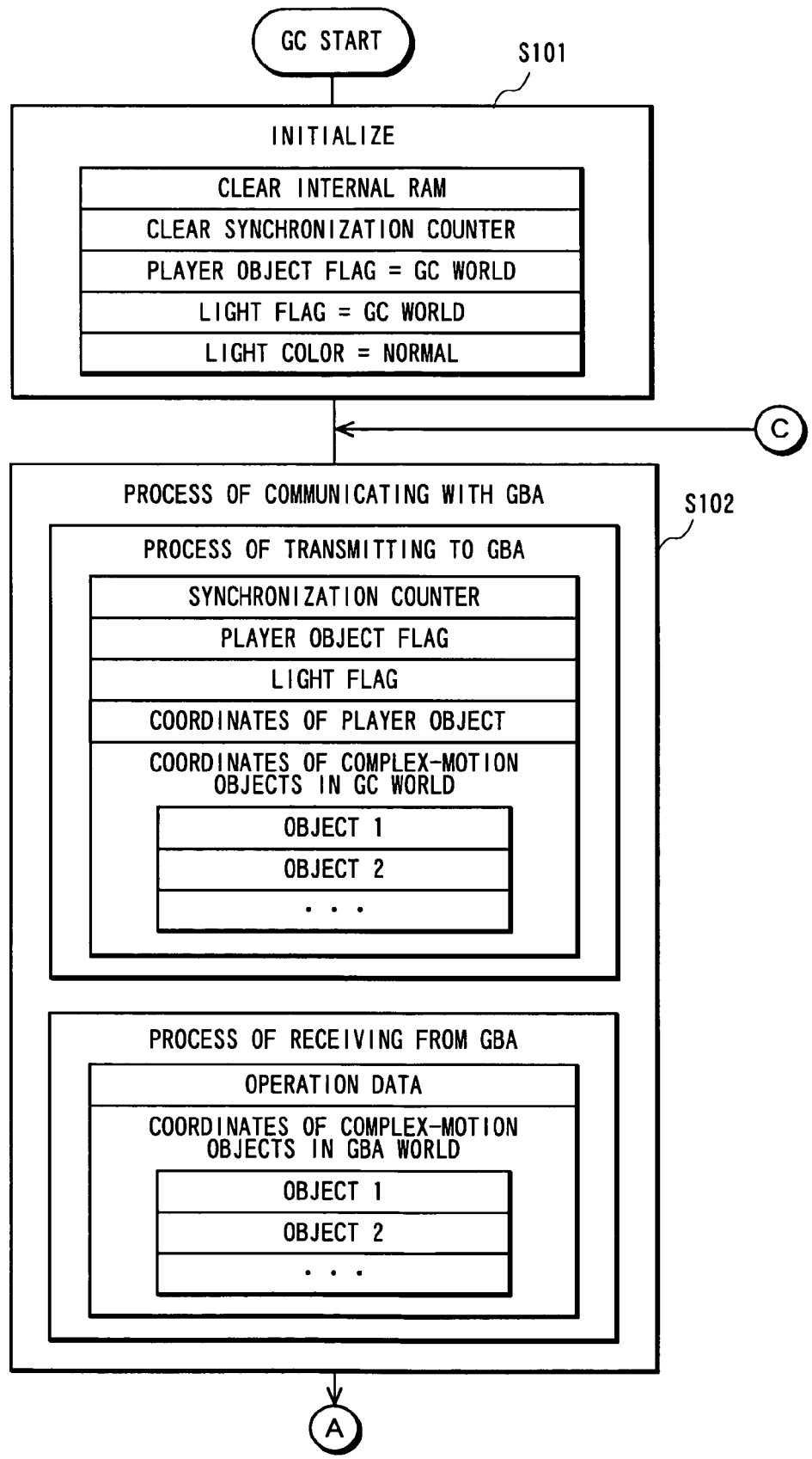
FIG. 21 is a first part of a flowchart showing a flow of a process performed by a CPU 201 of the non-portable game console (GC) 20.
Figure 22:
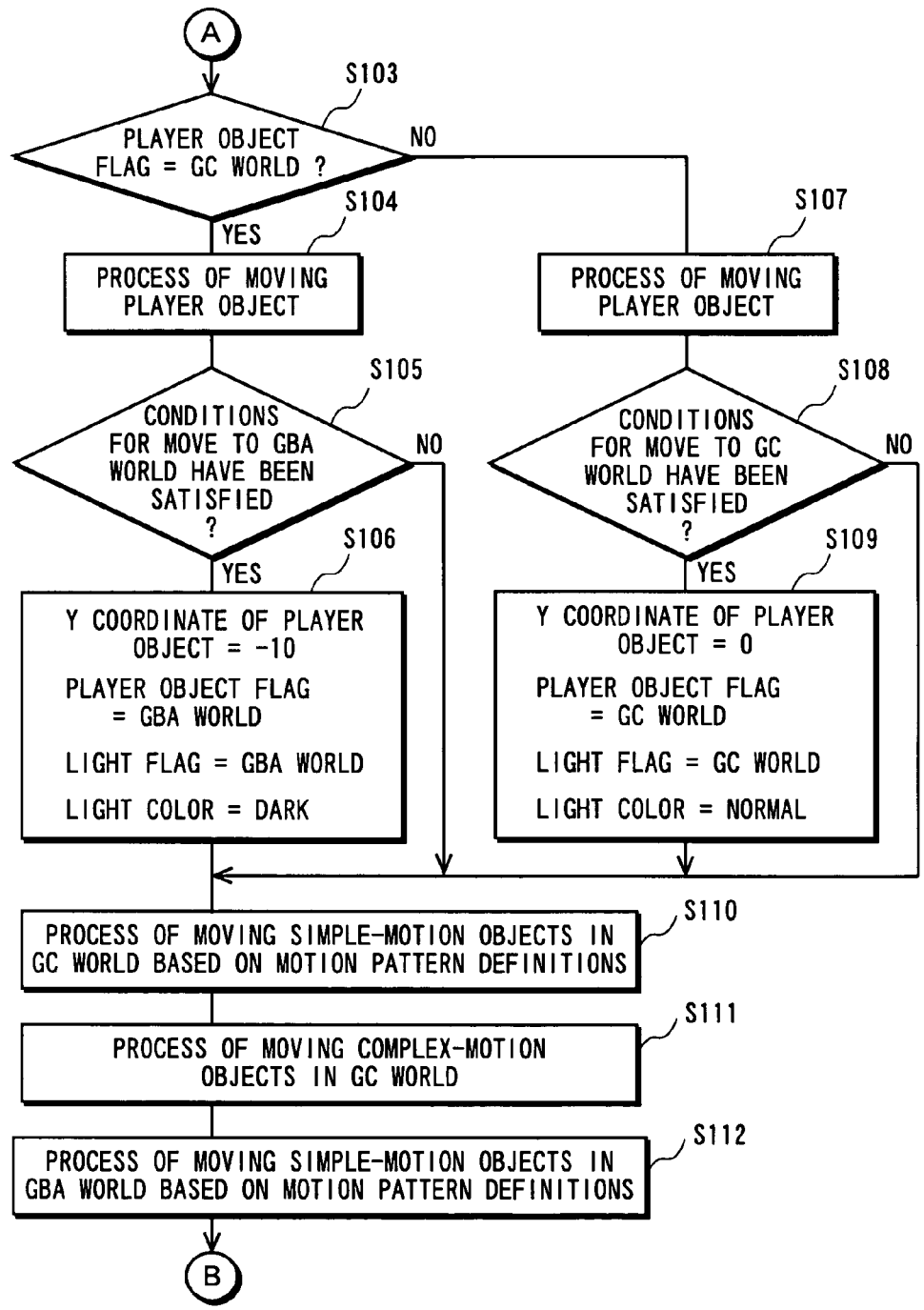
FIG. 22 is a second part of the flowchart showing the flow of the process performed by the CPU 201 of the non-portable game console (GC)
Figure 23:
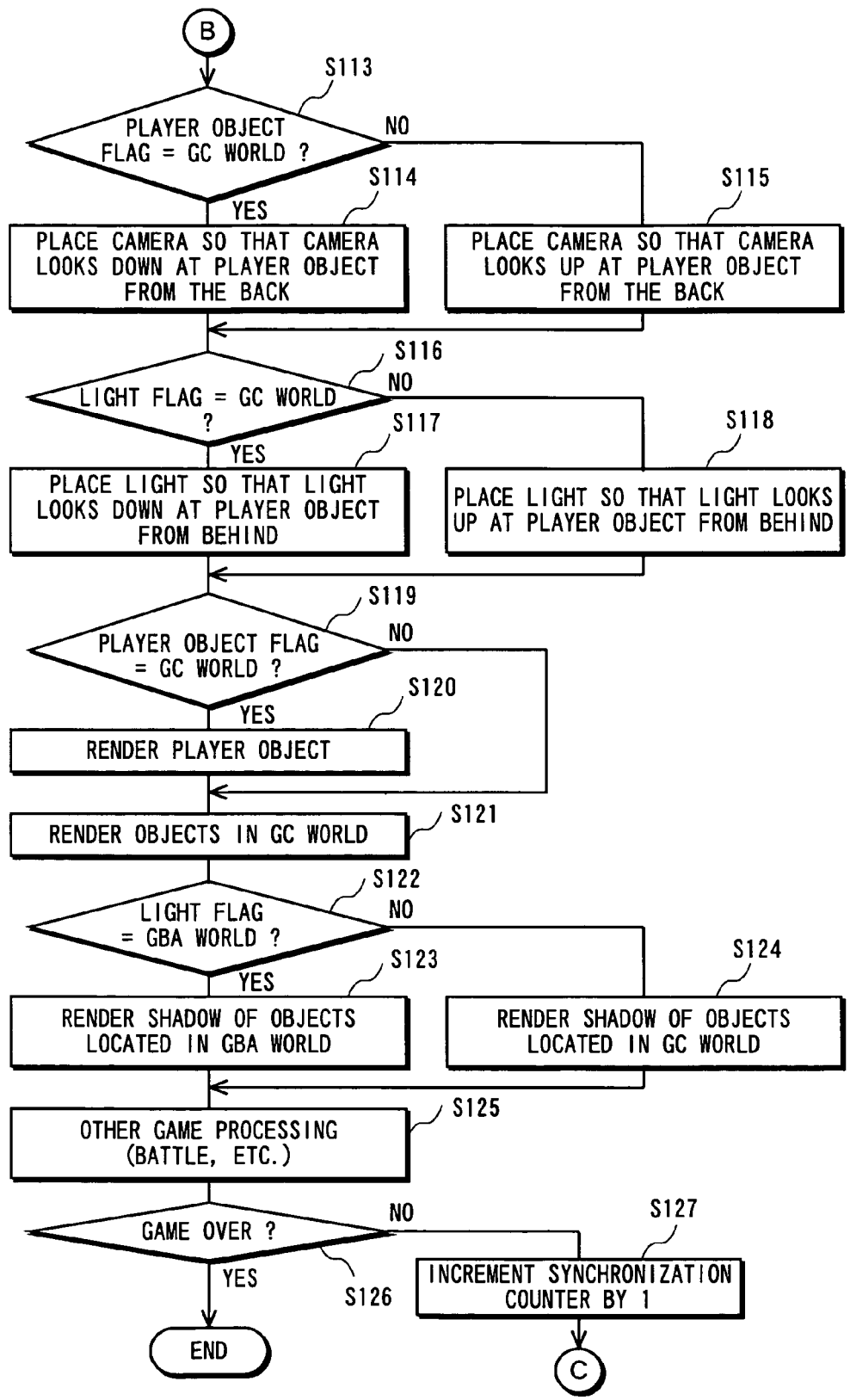
FIG. 23 is a last part of the flowchart showing the flow of the process performed by the CPU 201 of the non-portable game console (GC)

With reference to FIGS. 21 through 23, a process performed by the CPU 201 of the non-portable game console (GC) 20 is described below. In FIG. 21, an initializing process is first performed. Specifically, the main memory 207 is cleared, and then the synchronization counter illustrated in FIG. 17 is cleared. When the game is started, the player object is located in the GC world. Therefore, the player object flag is set to the GC world, the light flag is set to the GC world, and the light color is set to normal (S101). Upon completion of this initializing process, a communication process is performed with the portable game machine (GBA) 50 (S102). In this communication, the values of the synchronization counter, the player object flag, and the light flag, the coordinates of the player object, and the coordinates of each complex-motion object in the GC world are transmitted to the portable game machine 50. From the portable game machine 50, on the other hand, the operation data and the coordinates of each complex-motion object in the GBA world are received. In an exemplary illustrative game system, the value of the synchronization counter incremented at the non-portable game console 20 side is transmitted through the above communication process to the portable game machine 50 side. Based on this value of the synchronization counter, the portable game machine 50 performs game processing. In this way, the value of the synchronization counter is shared between the non-portable game console 20 and the portable game machine 50. This can reliably reduce a time lag in the process between the game machines, compared with a case where each game machine performs game processing based on each independently-counted value of the synchronization counter.

Upon completion of the communication process, in FIG. 22, it is determined whether the player object flag has been set to the GC world (S103).

If it is determined in step S103 that the player object flag has been set to the GC world, the player object located in the GC world is moved based on the operation data received in step S102 (S104). After this moving process, it is determined whether conditions for the player object to move to the GBA world have been satisfied (step S105). This determination can be made, for example, by judging whether the player character has fallen from the ladder illustrated in FIG. 6. If it is determined in step S105 that the conditions for the player object to move to the GBA world have been satisfied, the Y coordinate of the player object is updated to −10, the player object flag is updated to the GBA world, the light flag is updated to the GBA world, and the light color is updated to dark (S106). The procedure then goes to step S110. On the other hand, if it is determined in step S105 that the conditions for the player object to move to the GBA world have not been satisfied, the flags and others mentioned above are not updated, and then the procedure goes to step S110.

If it is determined in step S103 that the player object flag has been set to the GBA world, the player object located in the GBA world is moved based on the operation data received in step S102 (S107). After this moving process, it is determined whether conditions for the player object to move to the GC world have been satisfied (step S108). This determination can be made, for example, by judging whether the player character has been overlaid with the ladder for going up to the GC world. If it is determined in step S108 that the conditions for the player object to move to the GC world have been satisfied, the Y coordinate of the player object is updated to 0, the player object flag is updated to the GC world, the light flag is updated to the GC world, and the light color is updated to normal (S109). The procedure then goes to step S110. On the other hand, if it is determined in step S108 that the conditions for the player object to move to the GC world have not been satisfied, the flags and others mentioned above are not updated, and then the procedure goes to step S110.

In step S110, the CPU 201 causes each simple-motion object in the GC world to be moved in accordance with the motion pattern definition illustrated in FIG. 16. Then, the CPU 201 calculates a motion destination of each complex-motion object in the GC world, and then causes the complex-motion object in the GC world to be moved (S111). Also, in accordance with the motion pattern definition, the CPU 201 causes each simple-motion object in the GBA world to be moved (S112).

Upon completion of the process of moving each object, as shown in FIG. 23, it is determined whether the player object flag has been set to the GC world (S113). If the player object flag has been set to the GC world, the camera is placed so as to look down at the player object from the back as illustrated in FIG. 8 (S114). If the player object flag has been set to the GBA world, on the other hand, the camera is placed so as to look up at the player object from the back as illustrated in FIG. 12 (S115).

Then, it is determined whether the light flag has been set to the GC world (S116). If the light flag has been set to the GC world, the light is placed so as to look down at the player object from the back as illustrated in FIG. 8 (S117). If the light flag has been set to the GBA world, on the other hand, the light is placed so as to look up at the player object from the back as illustrated in FIG. 12 (S118).

Upon completion of placing the camera and the light, it is determined whether the player object flag has been set to the GC world (S119). If the player object flag has been set to the GC world, the player object is rendered in the color buffer (S120), and then each object located in the GC world (simple-motion object, complex-motion object, fixed object, and terrain object) is rendered in the color buffer 205 (S121). If the player object flag has been set to the GBA world, on the other hand, the player object is not rendered, and each object in the GC world is rendered in the color buffer 205 (S121). When each object in the GC world is rendered in the color buffer 205, the z buffer is used as required.

Upon completion of rendering each object in the GC world, it is determined whether the light flag has been set to the GBA world (S122).

If it is determined in step S122 that the light flag has been set to the GBA world, the shadow of each object in the GBA world (simple-motion object, complex-motion object, and fixed object) is rendered in the color buffer 205, and then the resultant image data is output to the TV monitor 10 (S123). Here, if the player object is located in the GBA world, the shadow of the player object is also rendered. The process of rendering the shadows in this step S123 is performed by using the scheme illustrated in FIG. 14. Note that the coordinates of each simple-motion object in the GBA world have been obtained through the moving process in step S112. Also, the coordinates of each complex-motion object in the GBA world have been obtained through the receiving process in step S102. Furthermore, the coordinates of each fixed object in the GBA world have been stored in advance in the DVD 30. Still further, the coordinates of the player object have been obtained through the moving process in step S104 or S107.

On the other hand, if it is determined in step S122 that the light flag has been set to the GC world, a shadow of each object located in the GC world (simple-motion object, complex-motion object, and fixed object) is rendered in the color buffer 205, and then the resultant image data is output to the TV monitor 10 (S123). Here, if the player object is located in the GC world, a shadow of the player object is also rendered.

Upon completion of rendering the shadows in step S123 or S124, game processing other than the game image generating process is performed, such as a battle process (S125). Then, it is determined whether the game is over (S126). If the game is over, the process of the CPU 201 ends. If the game continues, the synchronization counter is incremented (S127), and then the procedure returns to step S102.

Figure 24:
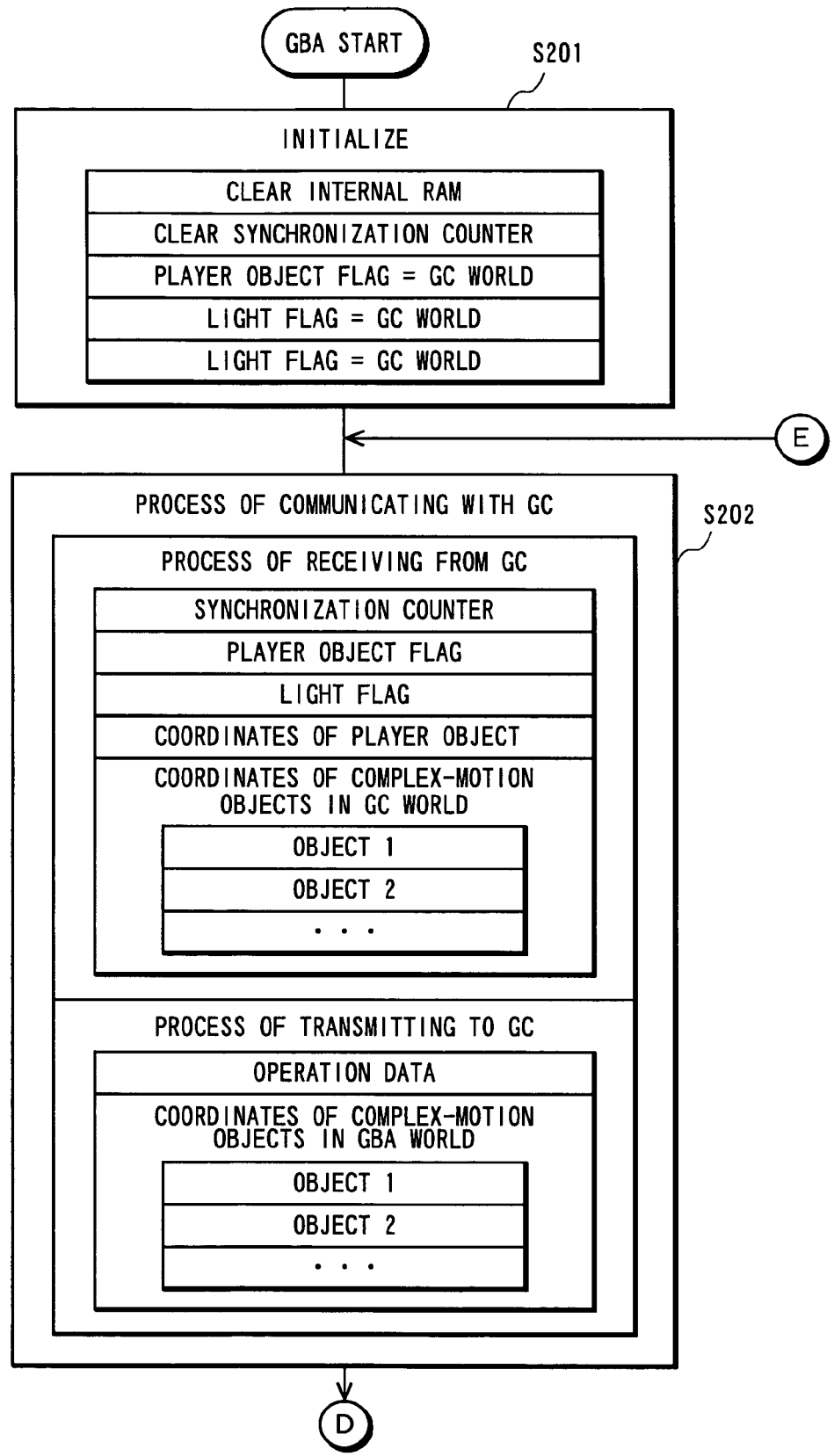
FIG. 24 is a first half of the flowchart showing a flow of a process performed by a CPU core 506 of the portable game machine (GBA) 50.
Figure 25:
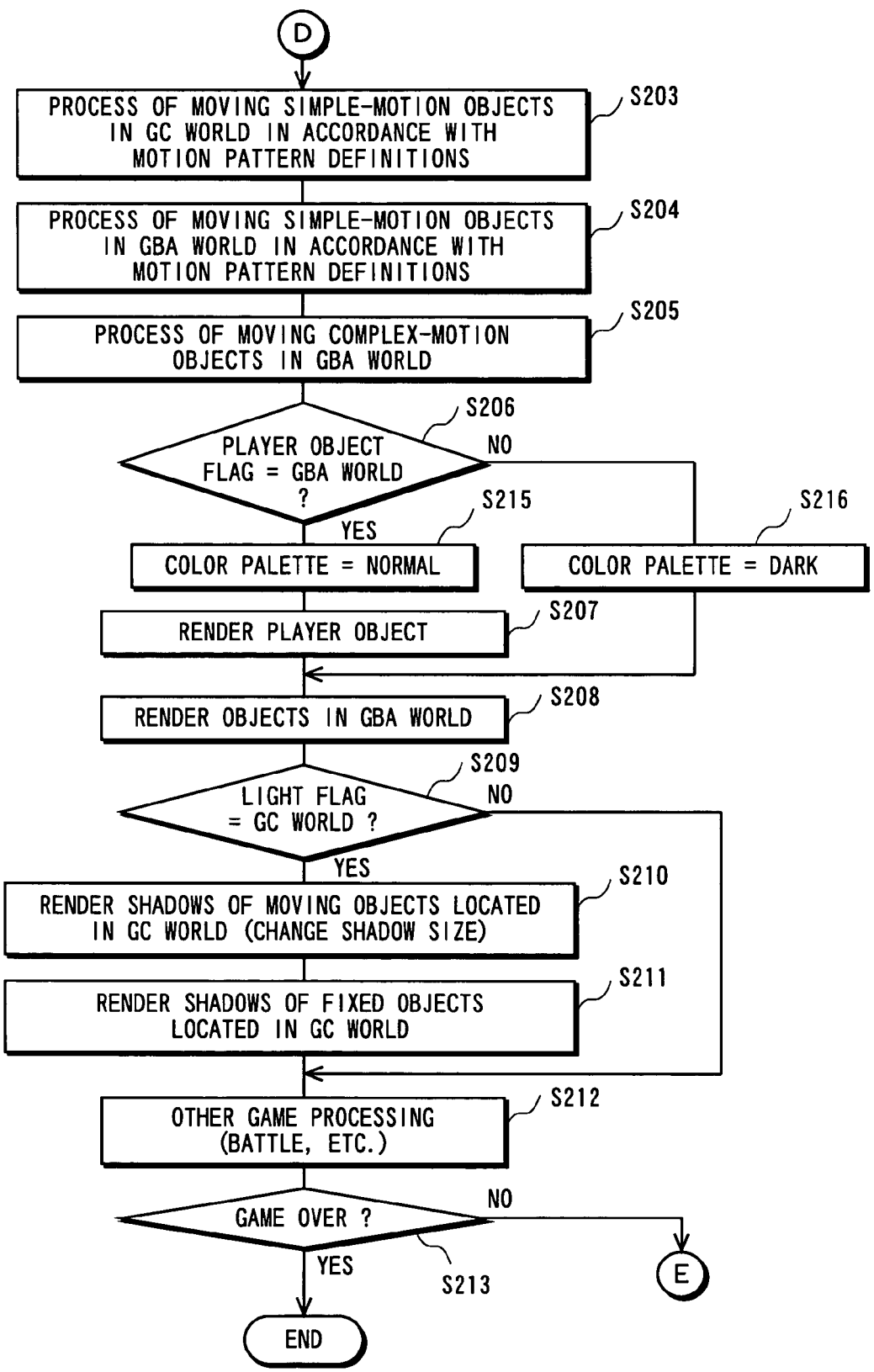
FIG. 25 is a latter half of the flowchart showing the flow of the process performed by a CPU core 506 of the portable game machine (GBA) 50.

With reference to FIGS. 24 and 25, a process performed by the CPU core 506 of the portable game machine 50 is described below. In FIG. 24, an initializing process is first performed. Specifically, the RAM 508 is cleared, and then the synchronization counter illustrated in FIG. 20 is cleared. Also, the player object is set to the GC world, the light flag is set to the GC world, and the color palette is set to dark (S201). Upon completion of the initializing process, a communication process is performed with the non-portable game console (GC) 20 (S202). In this communication, the values of the synchronization counter, the player object flag, and the light flag, the coordinates of the player object, and the coordinates of each complex-motion object in the GC world are received from the non-portable game console 20. To the non-portable game console 20, on the other hand, the operation data and the coordinates of each complex-motion object in the GBA world are transmitted.

Upon completion of the communication process, in FIG. 25, the CPU core 506 causes each simple-motion object in the GC world to be moved in accordance with the motion pattern definition illustrated in FIG. 19 (S203). Then, in accordance with the motion pattern definition illustrated in FIG. 19, the CPU core 506 also causes each simple-motion object in the GBA world to be moved (S204). Furthermore, the CPU core 506 calculates a motion destination of each complex-motion object in the GBA world, and then causes each complex-motion object in the GBA world to be moved (S205).

Upon completion of the process of moving each object, it is determined whether the player object flag has been set to the GBA world (S206). If the player object flag has been set to the GBA world, the color palette is set to normal (S215), and then the player object is rendered in the color buffer allocated in the RAM 508 (S207). Then, each object located in the GBA world (simple-motion object, complex-motion object, fixed object, and terrain object) are rendered in the color buffer (S208). If the player object flag has been set to the GC world, on the other hand, the color palette is set to dark (S216), and then each object in the GBA world is rendered in the color buffer (S208).

Upon completion of rendering each object in the GBA world, it is determined whether the light flag has been set to the GC world (S209).

If it is determined in step S209 that the light flag has been set to the GC world, the shadow of each of the simple-motion objects and the complex-motion objects in the GC world is rendered in the color buffer (S210). At this time, as illustrated in FIG. 9, the size of each shadow image is changed in accordance with the Y coordinate of the moving object. If the player object is located in the GC world, the shadow of the player object is also rendered. Note that the coordinates of each simple-motion object in the GC world have been obtained through the moving process in step S203. Also, the coordinates of each complex-motion object in the GC world have been obtained through the receiving process in step S202. Upon completion of rendering the shadows of the moving objects, the shadow of each fixed object in the GC world is rendered in the color buffer. The resultant image data is then output to the LCD 502 (S211). The procedure then goes to step S212. Note that the coordinates of each fixed object in the GC world have been stored in advance in the ROM 601.

On the other hand, if it is determined in step S209 that the light flag has been set to the GBA world, the procedure goes to step S212 without performing a shadow rendering process.

In step S212, game processing other than the game image generating process is performed, such as a battle process. It is then determined whether the game is over (S213). If the game is over, the process of the CPU core 506 ends, and the procedure returns to step S202.

As described above, according to certain exemplary illustrative embodiments, a shadow of an object located in one world is displayed in the other world. Therefore, the player can easily know a relative positional relationship between the objects located in the respective worlds.

Also, the shadow represents the position of the object located in the other world. Therefore, it is possible to naturally display the relative positional relationship between the objects located in the respective worlds without losing their reality.

Furthermore, when the shadow of an object located in the other world is displayed, the motion destination is predicted based on the motion pattern of the object. Therefore, the coordinates of that object do not have to be obtained through communication, thereby reducing the amount of communication between the non-portable game console and the portable game machine.

Still further, in certain exemplary illustrative embodiments, the shadow of the object located in the GC world is displayed on the GBA world. This is not meant to be restrictive, and any image relating to the object will suffice. For example, a translucent image of an object located in the GC world (such as a ghost-like translucent image of the player object) can be displayed in the GBA world. Also in this case, based on this translucent image, the player can easily know the relative positional relationship between the objects located in the respective worlds. Furthermore, a translucent shadow can be displayed. In order to display such a translucent image, for example, a translucent image is stored in advance in the ROM 601 of the portable game machine 50 instead of the shadow image data. Then, this translucent image is placed in the GBA world by using, for example, the scheme shown in FIG. 9.

Still further, in certain exemplary illustrative embodiments, the light is a point source of light. This is not meant to be restrictive, and the shadows can be displayed based on parallel rays.

Still further, in certain exemplary illustrative embodiments, the positional relationship between the GC world and the GBA world is such that the GC world is located in an upper layer and the GBA world is located in a lower layer. This is not meant to be restrictive, and the positional relationship can be such that these two worlds are horizontally aligned.

Still further, in certain exemplary illustrative embodiments, the shadow of the object located in the three-dimensional GC world is displayed on the two-dimensional GBA world, or the shadow of the object located in the two-dimensional GBA world is displayed on the three-dimensional GC world. This is not meant to be restrictive. For example, the shadow of an object located in a three-dimensional game world can be displayed in another three-dimensional game world.

Still further, in certain exemplary illustrative embodiments, the programs executed in the non-portable game console (GC) 20 (e.g., object-moving programs and rendering programs) are supplied through the DVD 30. This is not meant to be restrictive. For example, the programs can be supplied through a computer-readable recording medium, such as a CD-ROM or a game cartridge, can be stored in advance in the non-portable game console 20, and can be externally supplied as required through communication. Still further, the programs to be executed in the portable game machine (GBA) 50 (object-moving programs and rendering programs) are supplied through the game cartridge 60. This is not meant to be restrictive. For example, the programs can be supplied through a computer-readable recording medium, such as a CD-ROM or a DVD, can be stored in advance in the portable game machine 50, and can be externally supplied as required through communication.

Still further, in certain exemplary illustrative embodiments, a portable game machine is used as the controller of the non-portable game console. This is not meant to be restrictive. For example, instead of the portable game machine, a controller having a liquid crystal screen can be used. Still further, instead of providing a non-portable game console and a portable game machine, a plurality of non-portable game consoles can be connected for use. Further, an exemplary illustrative game system does not necessarily include two separate game machines. The game system according to certain exemplary illustrative embodiments can be applied to, for example, a game machine having two display screens that is placed in a commercial amusement arcade.

As described in the foregoing, according to the above-mentioned first aspect of certain exemplary illustrative embodiments, with the related image of the object located in the first game space, it is possible to display a positional relationship between the first game space and the second game space so that the player can easily know the relationship. Also, the player can know the position of the object located in the first game space only by viewing the game image displayed on the second display means.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A game system in which two virtual game spaces, comprising a three-dimensional first game space and a two-dimensional second game space wherein the second game space corresponds to a predetermined two-dimensional plane within the first game space, and wherein the two virtual game spaces are separately displayed respectively on a first display device and a second display device, the game system comprising:

first display control programmed logic circuitry that causes an object, contained in a first game space represented by a three-dimensional coordinate system, to be displayed on the first display;

second display control programmed logic circuitry that causes an object, contained in a second game space represented by a two-dimensional coordinate system, to be displayed on the second display; and coordinate converting programmed logic circuitry which performs a coordinate computing process, in which three-dimensional coordinates corresponding to a location of an object in the first game space are mathematically projected onto a two-dimensional plane within the first game space that corresponds to the second game space so as to determine coordinates that are indicative of a location where a shadow of the object would occur on the two-dimensional plane when produced by a light positioned at a predetermined location within the first game space, wherein the second display control programmed logic circuitry further displays on the second display a related image which corresponds to the object in the first game space and which is located at the determined coordinates in the second game space.

2. The game system according to claim 1, wherein the first display control programmed logic circuitry causes only the first game space to be displayed on the first display, and the second display control programmed logic circuitry causes only the second game space to be displayed on the second display.

3. The game system according to claim 1, wherein an object to be displayed is a player character controllable by a player.

4. The game system according to claim 1, wherein an object to be displayed is a moving object.

5. The game system according to claim 1, further comprising:

condition judging programmed logic circuitry configured to determine whether predetermined conditions are satisfied; and character moving programmed logic circuitry configured to move a player character between the first game space and the second game space when said condition judging programmed logic circuitry determines that the predetermined conditions are satisfied;

character location determining programmed logic circuitry configured to determine in which one of said first game space and said second game the player character is located; and wherein when the character location determining programmed logic circuitry determines that the player character is located in the first game space, the first display control programmed logic circuitry causes the player character to be displayed on the first display, and when the character location determining programmed logic circuitry determines that the player character is located in the second game space, the second display control programmed logic circuitry causes the player character to be displayed on the second display.

6. The game system according to claim 1, wherein
the second display control programmed logic circuitry causes a related image representing a shadow of an object located in the first game space to be displayed on the second display.

7. The game system according to claim 1, wherein
the first display control programmed logic circuitry includes a first storage section for storing data used for displaying the first game space,
the second display control programmed logic circuitry includes a second storage section for storing data used for displaying the second game space,
the first storage section stores object data for displaying an object located in the first game space but not located in the second game space,
the second storage section stores related image display data for displaying a related image representing a shadow of the object located in the first game space but not located in the second game space, and
based on the related image display data, the second display control programmed logic circuitry causes said related image representing a shadow to be displayed on the second display.

8. The game system according to claim 1, wherein
the second display control programmed logic circuitry changes a size of the related image in accordance with a virtual relative positional relationship between the object located in the first game space and the second game space.

9. The game system according to claim 1, further comprising:
a first game machine for generating image data representing the first game space and outputting the image data to the first display; and
a second game machine for generating image data representing the second game space and outputting the image data to the second display.

10. The game system according to claim 9, wherein
the second game machine obtains a position in the first game space of an object located in the first game space from the first game machine and, based on the obtained position, causes the related image to be displayed on the second display.

11. The game system according to claim 9, wherein
the second game machine includes predicting programmed logic circuitry configured to predict a position in the first game space of the object located in the first game space and, based on the predicted position, causes the related image to be displayed on the second display.

12. The game system according to claim 11, wherein
the second game machine stores a motion pattern of the object located in the first game space, and
based on the motion pattern, the predicting programmed logic circuitry predicts a position in the first game space of the object.

13. The game system according to claim 9, wherein
the second game machine stores in advance a position of a fixed object fixedly located in the first game space and, based on the position, causes the related image of the fixed object to be displayed.

14. The game system according to claim 9, wherein
the second game machine is a portable game machine including the second display.

15. A method for use with a game system for separately displaying two virtual game spaces, consisting of a three-dimensional game space and a two-dimensional game space wherein the two-dimensional game space corresponds to a predetermined plane within the three-dimensional game space, the game spaces being respectively displayed on a first display device and a second display device, comprising:
displaying an object contained within a first game space represented by a three-dimensional coordinate system, on the first display;
displaying an object contained within a second game space represented by a two-dimensional coordinate, system on the second display; and
performing a coordinate computing process in which coordinates corresponding to a location of the object in the first game space are mathematically projected onto a plane within the first games space that corresponds to the second game space, so as to determine coordinates in the first game space that are indicative of a location where a shadow of the object would occur on the two-dimensional plane corresponding to the second game space; and
displaying a related image which corresponds to the object present in the first game space and which is located at the determined coordinates in the second game space.

16. The method according to claim 15, wherein
only the first game space is displayed on the first display, and
only the second game space is displayed on the second display.

17. The method according to claim 15, wherein a displayed object is a player character controllable by a player.

18. The method according to claim 15, wherein a displayed object is a moving object.

19. The method according to claim 15, further comprising:
judging whether predetermined conditions are satisfied;
determining whether the player character is located in the first game space or the second game space;
moving, when the predetermined conditions are satisfied, a player character between the first game space and the second game space;
displaying, when the player character is located in the first game space, the player character on the first display; and
displaying, when the player character is located in the second game space, the player character on the second display.

20. The method according to claim 15, further comprising:
displaying said related image of the object located in the first game space but not located in the second game space on the second display.

21. The method according to claim 15, further comprising:
storing data used for displaying the first game space in a first storage section, the first storage section storing object data for displaying an object located in the first game space but not located in the second game space;
storing data used for displaying the second game space in a second storage section, the second storage section storing related image display data for displaying said related image representing a shadow of the object located in the first game space but not located in the second game space; and
displaying, based on the related image display data, said related image of the object located in the first game space but not located in the second game space on the second display.

22. The method according to claim 15, further comprising:
changing a size of the related image in accordance with a virtual relative positional relationship between the object located in the first game space and the second game space.

23. The method according to claim 15, further comprising:
providing a first game machine for generating image data representing the first game space and outputting the image data to the first display; and
providing a second game machine for generating image data representing the second game space and outputting the image data to the second display.

24. The method according to claim 23, further comprising:
obtaining a position in the first game space of object located in the first game space from the first game machine by the second game machine; and
displaying, based on the obtained position, the related image on the second display using the second game machine.

25. The method according to claim 24, further comprising:
predicting a position in the first game space of the object located in the first game space using the second game machine; and
displaying, based on the predicted position, the related image on the second display using the second game machine.

26. The method according to claim 25, further comprising:
storing a motion pattern of the object located in the first game space in a memory location of the second game machine, and predicting, based on the motion pattern, a position in the first game space of the object.

27. The method according to claim 23, further comprising:
storing in advance a position of a fixed object fixedly located in the first game space in a memory location of the second game machine; and
displaying, based on the position, the related image of the fixed object.

28. The method according to claim 23, wherein the second game machine is a portable game machine including the second display.

29. A video game system having at least two display devices on which a virtual three-dimensional first game space and a virtual two dimensional second game space are separately displayed respectively on first display device and a second display device, the game system comprising:
first display control programmed logic circuitry configured to display on the first display a virtual game object, present within the first game space at a location represented by a three-dimensional coordinate; and
second display control programmed logic circuitry configured to display on the second display a virtual game object present within the second game space at a location represented by a two-dimensional coordinate wherein the two-dimensional game space corresponds to a predetermined plane within the three-dimensional game space and the first display control programmed logic circuitry further includes:
programmed logic circuitry at a location configured to create a related object image at a location within the first game space that corresponds to a current location of the object present in the second game space; and
programmed logic circuitry configured to display on the first display device, from a perspective of a camera capturing the object from the plane's underside and which a light source illuminating the object from the plane's underside, a shadow of the object that is cast due to the light source upon an object located in the first game space.

30. The game system according to claim 29, wherein the first display control programmed logic circuitry causes only the first game space to be displayed on the first display, and the second display control programmed logic circuitry causes only the second game space to be displayed on the second display.

31. The game system according to claim 29, further comprising:
condition judging programmed logic circuitry to determine whether predetermined conditions are satisfied; and
character moving programmed logic circuitry to move a player character between the first game space and the second game space when said condition judging programmed logic circuitry determines that the predetermined conditions are satisfied;
character location determining programmed logic circuitry to determine in which one of said first game space and said second game space the player character is located; and wherein
when the character location determining programmed logic circuitry determines that the player character is located in the first game space, the first display control programmed logic circuitry causes the player character to be displayed on the first display, and
when the character location determining programmed logic circuitry determines that the player character is located in the second game space, the second display control programmed logic circuitry causes the player character to be displayed on the second display.

32. A video game system having at least two display devices on which a virtual three-dimensional first game space and a virtual two dimensional second game space are separately displayed respectively on a first display device and a second display device, the game system comprising:
first display control programmed logic circuitry configured to display on the first display a virtual game object present within the first game space at a location represented by a three-dimensional coordinate; and
second display control programmed logic circuitry configured to display on the second display a virtual game object present within the second game space at a location represented by a two-dimensional coordinate, wherein the two-dimensional game space corresponds to a predetermined plane within three-dimensional game space and the first display control programmed logic circuitry further includes:
programmed logic circuitry configured to determine a projected shadow volume, whose shape corresponds to a shape of the two-dimensional object present in the second game space, within the first game space at a location on the plane that corresponds to a current location of the two-dimensional object in the second game space; and
programmed logic circuitry configured to display on the first display device, from a perspective of camera positioned to capture the shadow volume from a side of the plane, a shadow which is formed on the object in the first game space due to the projection of the shadow volume.

33. The game system according to claim 32, wherein the first display control programmed logic circuitry causes only the first game space to be displayed on the first display, and
the second display control programmed logic circuitry causes only the second game space to be displayed on the second display.

34. The game system according to claim 32, further comprising:
condition judging programmed logic circuitry to determine whether predetermined conditions are satisfied; and character moving programmed logic circuitry to move a player character between the first game space and the second game space when said condition judging programmed logic circuitry determines that the predetermined conditions are satisfied;

character location determining programmed logic circuitry to determine in which one of said first game space and said second game space the player character is located; and wherein when the character location determining programmed logic circuitry determines that the player character is located in the first game space, the first display control programmed logic circuitry causes the player character to be displayed on the first display, and when the character location determining programmed logic circuitry determines that the player character is located in the second game space, the second display control programmed logic circuitry causes the player character to be displayed on the second display.

35. A method for a game system in which two game spaces, which are each defined as a predetermined portion of a virtual space, are separately displayed respectively on a first display and a second display, comprising:

displaying a first objectcontained in a first game space represented by a three-dimensional coordinate system on the first display;

displaying a second object contained in a second game space represented by a two-dimensional coordinate system on the second display;

provisionally placing the second object present in the second game space into the first game space at a location on a plane within the first game space that corresponds to a relative position of the second game space with respect to the first game space, the location on the plane corresponding to a current location of the second object in the second game space; and displaying on the first display, in accordance with a camera capturing the provisionally placed object from the plane's underside and in accordance with a light illuminating the provisionally placed object from the plane's underside, a shadow of the provisionally placed object which is cast on another object in the first game space.

36. The method of claim 35, wherein only the first game space is displayed on the first display, and only the second game space is displayed on the second display.

37. The method of claim 35, further comprising:

determining whether predetermined game conditions are satisfied;

moving a player character between the first game space and the second game space when said predetermined game conditions are satisfied;

determining in which one of said first game space and said second game space the player character is located;

displaying the player character on the first display when the player character is determined to be located in the first game space; and when the player character is determined to be located in the second game space, displaying the player character on the second display.

38. A method for a game system in which two game spaces, which are each defined as a predetermined portion of a virtual space, are separately displayed respectively on a first display and a second display, the game system comprising:

displaying a first object contained in a first game space represented by a three-dimensional coordinate system on the first display;

displaying a second object contained in a second game space represented by a two-dimensional coordinate system on the second display;

provisionally placing a shadow volume prepared in advance whose shape corresponds to a shape of the second object present in the second game space into the first game space at a location on a plane within the first game space that corresponds to a relative position of the second game space with respect to the first game space, the location on the plane corresponding to a current location of the second object in the second game space; and displaying on the first display, in accordance with a camera capturing the shadow volume from the plane's underside and in accordance with the shadow volume, a shadow which is formed on the object in the first game space due to the shadow volume.

39. The method of claim 38, wherein only the first game space is displayed on the first display, and only the second game space is displayed on the second display.

40. The method according to claim 38, further comprising:

determining whether predetermined game conditions are satisfied;

moving a player character between the first game space and the second game space when said predetermine game conditions are satisfied;

determining in which one of said first game space and said second game space the player character is located;

displaying the player character on the first display when the player character is determined to be located in the first game space; and when the player character is determined to be located in the second game space, displaying the player character on the second display.

* * * * *